US012652066B2

(12) United States Patent
Gatta et al.

(10) Patent No.: US 12,652,066 B2
(45) Date of Patent: Jun. 9, 2026

(54) MEASUREMENT OF JAMMERS DUE TO ANTENNA COUPLING

(71) Applicant: QUALCOMM Incorporated, San Diego, CA (US)

(72) Inventors: Francesco Gatta, San Diego, CA (US); Balasubramanian Ramachandran, Hyderabad (IN); Abhishek Ananthrao Kulkarni, Gulbarga (IN); Soon-Seng Lau, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/363,321

(22) Filed: Aug. 1, 2023

(65) Prior Publication Data

US 2024/0048162 A1     Feb. 8, 2024

Related U.S. Application Data

(60) Provisional application No. 63/395,265, filed on Aug. 4, 2022.

(51) Int. Cl.
| | |
|---|---|
| *H04B 1/00* | (2006.01) |
| *H04B 1/04* | (2006.01) |
| *H04B 1/18* | (2006.01) |
| *H04B 7/06* | (2006.01) |

(52) U.S. Cl.
CPC ......... *H04B 1/0064* (2013.01); *H04B 1/0475* (2013.01); *H04B 1/18* (2013.01)

(58) Field of Classification Search
None
See application file for complete search history.

(56) References Cited

U.S. PATENT DOCUMENTS

| | | | | |
|---|---|---|---|---|
| 6,208,844 B1 * | 3/2001 | Abdelgany | ............. | G01S 19/35 |
| | | | | 342/357.31 |
| 8,055,229 B2 * | 11/2011 | Huang | ................. | H03G 3/3052 |
| | | | | 455/245.2 |
| 11,381,268 B1 * | 7/2022 | Daruwalla | ............... | H04B 1/18 |
| 2005/0170788 A1 * | 8/2005 | Tanaka | ................. | H03G 3/3042 |
| | | | | 455/73 |
| 2011/0086603 A1 * | 4/2011 | Toosi | ..................... | H04B 17/21 |
| | | | | 455/192.1 |

(Continued)

OTHER PUBLICATIONS

International Search Report and Written Opinion—PCT/US2023/071490—ISA/EPO—Jan. 30, 2024.

*Primary Examiner* — Pablo N Tran
(74) *Attorney, Agent, or Firm* — Loza & Loza LLP

(57)     ABSTRACT

A system for wireless communications includes a first radio frequency front-end (RFFE) circuit coupled to a first antenna and a second RFFE coupled to a second antenna. The first RFFE circuit includes a first filter having a first passband spanning a first frequency band, a first low-noise amplifier (LNA) coupled to the first filter, and a bypass circuit configured to bypass the first filter, the bypass circuit including an attenuator. The first RFFE also includes a first switching circuit configured to couple the first antenna to the first filter or the bypass circuit. The second RFFE circuit includes a power amplifier, and a second filter coupled between the power amplifier and the second antenna, the second filter having a second passband spanning a second frequency band different than the first frequency band.

30 Claims, 15 Drawing Sheets

(56)  References Cited

U.S. PATENT DOCUMENTS

| | | | |
|---|---|---|---|
| 2012/0157029 A1* | 6/2012 | Matsuura | H04H 20/106 |
| | | | 455/253.2 |
| 2013/0003617 A1 | 1/2013 | Gudem et al. | |
| 2018/0262231 A1* | 9/2018 | Pusl, III | H04B 1/48 |
| 2019/0288825 A1* | 9/2019 | Kang | H03F 3/24 |
| 2019/0363690 A1* | 11/2019 | Golat | H03F 3/19 |
| 2021/0067186 A1 | 3/2021 | Beaudin et al. | |

* cited by examiner

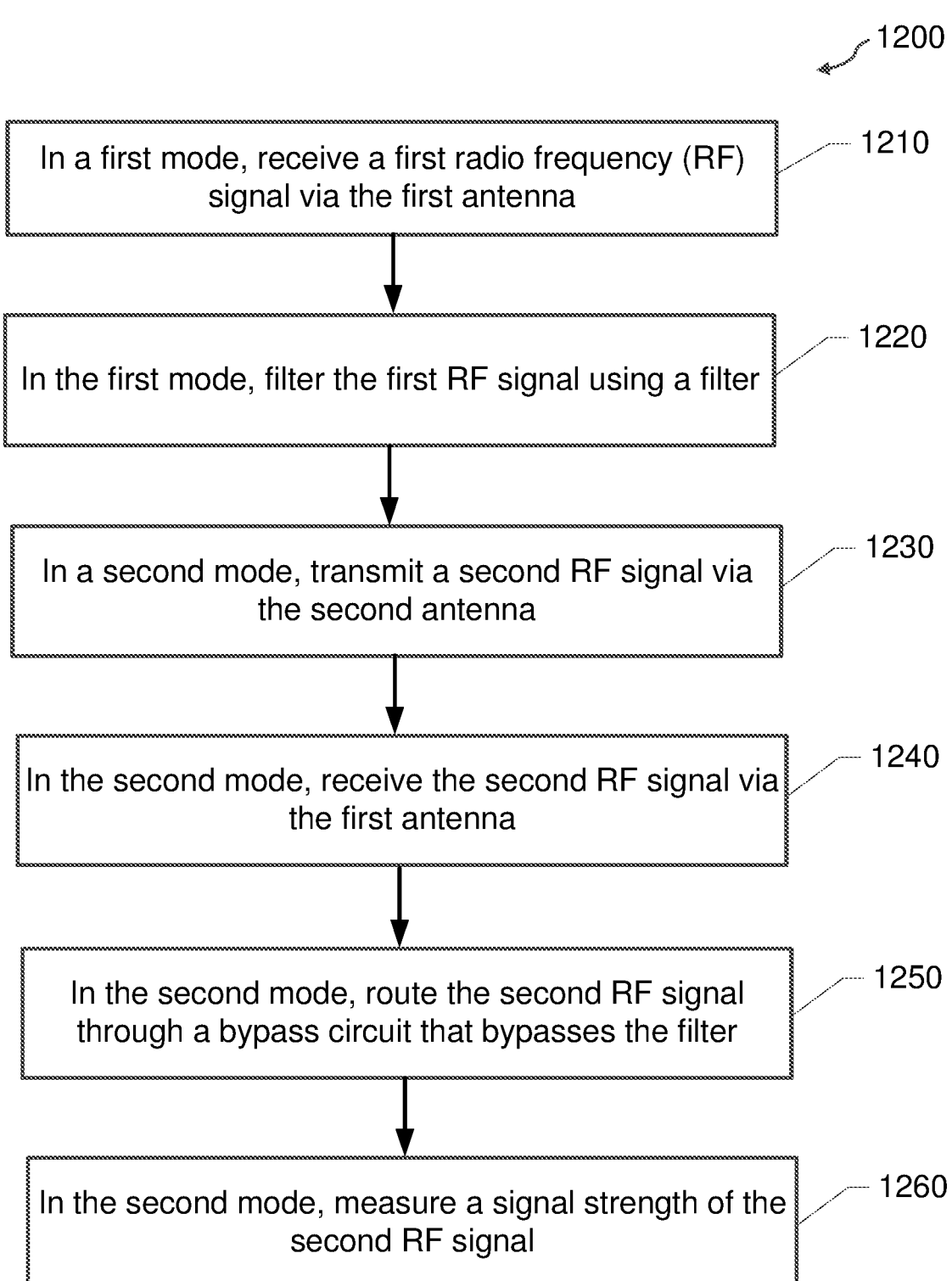

1200

In a first mode, receive a first radio frequency (RF) signal via the first antenna — 1210

In the first mode, filter the first RF signal using a filter — 1220

In a second mode, transmit a second RF signal via the second antenna — 1230

In the second mode, receive the second RF signal via the first antenna — 1240

In the second mode, route the second RF signal through a bypass circuit that bypasses the filter — 1250

In the second mode, measure a signal strength of the second RF signal — 1260

FIG. 12

MEASUREMENT OF JAMMERS DUE TO ANTENNA COUPLING

RELATED APPLICATION

This application claims the benefit of Provisional Patent Application No. 63/395,265, filed on Aug. 4, 2022, the entire specification of which is incorporated herein.

BACKGROUND

Field

Aspects of the present disclosure relate generally to wireless communications, and, more particularly, to measurement of jammers on a wireless device.

Background

A wireless device may include multiple antennas for transmitting and/or receiving radio frequency (RF) signals. For example, the wireless device may receive a first RF signal via a first antenna, and transmit a second RF signal via a second antenna. Due to antenna coupling between the first antenna and the second antennas, a portion of the energy of the second RF signal transmitted from the second antenna is coupled to the first antenna, which may potentially cause interference with reception of the first RF signal.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a system for wireless communications. The system includes a first radio frequency front-end (RFFE) circuit coupled to a first antenna and a second RFFE coupled to a second antenna. The first RFFE circuit includes a first filter having a first passband spanning a first frequency band, a first low-noise amplifier (LNA) coupled to the first filter, and a bypass circuit configured to bypass the first filter, the bypass circuit including an attenuator. The first RFFE also includes a first switching circuit configured to couple the first antenna to the first filter or the bypass circuit. The second RFFE circuit includes a power amplifier, and a second filter coupled between the power amplifier and the second antenna, the second filter having a second passband spanning a second frequency band different than the first frequency band.

A second aspect relates to a method for operating a wireless device, the wireless device including a first antenna and a second antenna. The method includes, in a first mode, receiving a first radio frequency (RF) signal via the first antenna, and filtering the first RF signal using a filter. The method also includes, in a second mode, transmitting a second RF signal via the second antenna, receiving the second RF signal via the first antenna, routing the second RF signal through a bypass circuit that bypasses the filter, and measuring a signal strength of the second RF signal.

A third aspect relates to a system including a first antenna and a second antenna. The system includes means for receiving a first radio frequency (RF) signal via the first antenna, means for filtering the first RF signal, means for transmitting a second RF signal via the second antenna, the means for receiving the first RF signal via the first antenna further comprising means for receiving the second RF signal via the first antenna, means for routing the second RF signal through a bypass circuit that bypasses the filter, and means for measuring a signal strength of the second RF signal.

A fourth aspect relates to a system for wireless communications. The system includes a first radio frequency front-end (RFFE) circuit coupled to a first antenna, the first RFFE circuit designed to condition signals for transmission and/or reception in a first frequency range, the first RFFE circuit comprising one or more circuits configured to provide a broadband bypass mode for a receive signal in a second frequency range different from the first frequency range. The system also includes a second RFFE circuit coupled to a second antenna, the second RFFE circuit designed to condition signals for transmission and/or reception in the second frequency range.

A fifth aspect relates to a system for wireless communications. The system includes a modem integrated circuit, a transceiver integrated circuit coupled to the modem integrated circuit, and a first radio frequency front-end (RFFE) circuit coupled between the transceiver integrated circuit and a first antenna. The first RFFE circuit includes a first low-noise amplifier (LNA) configured to amplify a first signal in a first frequency band, a first filter coupled to the first LNA, the first filter having a first passband spanning the first frequency band, a bypass circuit configured to bypass the first filter, the bypass circuit configured to pass a second signal in a second frequency band different than the first frequency band to the transceiver circuit, and a first switching circuit configured to couple the first antenna to the first filter or the bypass circuit. The system also includes a second RFFE circuit coupled between the transceiver integrated circuit and a second antenna. The second RFFE circuit includes a first power amplifier; and a second filter coupled between the first power amplifier and the second antenna, the second filter having a second passband spanning the second frequency band.

A sixth aspect relates to a system for wireless communications. The system includes a filter having a passband spanning a first frequency band, a first low-noise amplifier (LNA) coupled to the filter, the first LNA tuned to amplify a first signal in the first frequency band, a bypass circuit configured to bypass the filter, the bypass circuit including a second LNA tuned to amplify a second signal in a second frequency band different than the first frequency band, and a first switching circuit configured to couple a first antenna to the filter or the bypass circuit.

BRIEF DESCRIPTION OF THE DRAWINGS

FIG. 12 is a flowchart illustrating a method for operating a wireless device according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
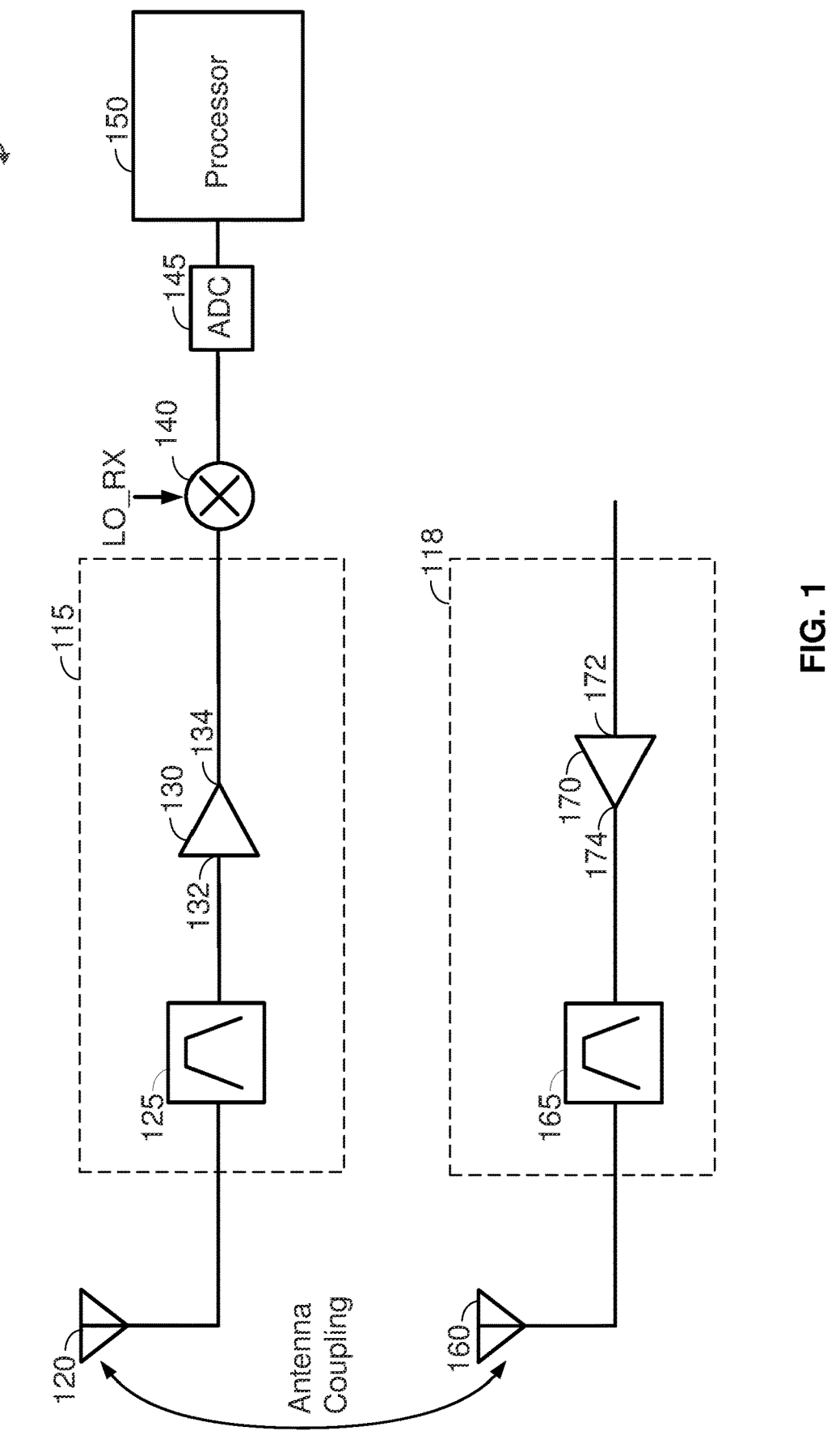
FIG. 1 shows an example of a wireless device including multiple antennas according to certain aspects of the present disclosure.

FIG. 1 shows an example of a wireless device 110 according to certain aspects. The wireless device 110 may be a cellular phone, a tablet computer, a laptop computer, an Internet of Things (IoT) device, an Internet of Everything (IoE) device, or the like. In the example shown in FIG. 1, the wireless device 110 includes a first antenna 120, a second antenna 160, a receiver 115, and a transmitter 118. Although two antennas 120 and 160 are shown in FIG. 1 for simplicity, it is to be appreciated that the wireless device 110 may include more than two antennas. In certain aspects, the receiver 115 may be included in a first radio frequency front-end (RFFE) circuit, and the transmitter 118 may be included in a second RFFE circuit.

In the example shown in FIG. 1, the receiver 115 includes a first filter 125 and a low-noise amplifier 130. The low-noise amplifier 130 has an input 132 and an output 134, and the first filter 125 is coupled between the first antenna 120 and the input 132 of the low-noise amplifier 130.

In certain aspects, the first filter 125 is a bandpass filter configured to pass radio frequency (RF) signals in a first frequency band. For example, the first filter 125 may have a passband spanning the first frequency band. The first frequency band may be within a sub-6 GHz band (e.g., any one of the LTE bands, 5G NR bands, wireless local area network (WLAN) bands (e.g., WiFi 2 or 5 GHz), and the like), a millimeter wave (mmWave) band, or the like. The first filter 125 may include an acoustic filter, an inductor-capacitor (LC) filter, a cavity filter, a combination thereof, and/or the like. Examples of an acoustic filter include a surface acoustic wave (SAW) filter, a bulk acoustic wave (BAW) filter, and the like. As used herein, a "bandpass filter" is a filter configured to pass an RF signal (e.g., with less than 3 dB attenuation) within a frequency band.

The low-noise amplifier 130 is configured to receive an RF signal from the first filter 125 at the input 132, amplify the RF signal, and output the amplified RF signal at the output 134. In one example, the low-noise amplifier 130 may be configured (e.g., tuned) to amplify RF signals in the first frequency band.

It is to be appreciated that the receiver 115 may include one or more additional components not shown in FIG. 1. For example, in some implementations, the receiver 115 may include one or more additional filters (e.g., bandpass filters) coupled to the first antenna 120 for receiving RF signals in multiple frequency bands. In these implementations, the first filter 125 and the one or more additional filters may be coupled to the first antenna 120 through a diplexer and/or another circuit.

In the example in FIG. 1, the transmitter 118 includes a power amplifier 170 and a second filter 165. The power amplifier 170 has an input 172 and an output 174. The power amplifier 170 is configured to receive an RF signal at the input 172 (e.g., from a mixer), amplify the RF signal, and output the amplified RF signal at the output 174.

The second filter 165 is coupled between the output 174 of the power amplifier 170 and the second antenna 160. In certain aspects, the second filter 165 is a bandpass filter configured to pass RF signals in a second frequency band. For example, the second filter 165 may have a passband spanning the second frequency band. The second frequency band may be within a sub-6 GHz band (e.g., any one of the LTE bands, 5G NR bands, WLAN bands (e.g., WiFi 2 or 5 GHz), and the like), a millimeter wave (mmWave) band, or the like. The second filter 165 may include an acoustic filter, an LC filter, a cavity filter, a combination thereof, and/or the like. Examples of an acoustic filter include a SAW filter, a BAW filter, and the like. The second frequency band may be different from the first frequency band, or the same as the first frequency band.

It is to be appreciated that the transmitter 118 may include one or more additional components not shown in FIG. 1. For example, in some implementations, the transmitter 118 may include one or more additional filters (e.g., bandpass filters) coupled to the second antenna 160 for transmitting RF signals in multiple frequency bands. In these implementations, the second filter 165 and the one or more additional filters may be coupled to the second antenna 160 through a diplexer and/or another circuit.

In the example shown in FIG. 1, the wireless device 110 also includes a mixer 140, an analog-to-digital converter (ADC) 145, and a processor 150. The mixer 140 is coupled to the output 134 of the low-noise amplifier 130, and the ADC 145 is coupled between the mixer 140 and the processor 150. In certain aspects, the mixer 140 is configured to mix the RF signal from the low-noise amplifier 130 with a local oscillator signal (labeled "LO_RX") to frequency down-convert the RF signal to a baseband signal. The ADC 145 is configured to convert the baseband signal into a digital signal, and output the digital signal to the processor 150.

The processor 150 is configured to process the digital signal. The processing performed by the processor 150 may include one or more of the following: demodulation, decoding, filtering, and the like. The processor 150 may include a baseband processor, a modem, a digital signal processor (DSP), a general-purpose processor, a central processing unit (CPU), a microcontroller, an application specific integrated circuit (ASIC), a field programmable gate array (FPGA), a programmable logic device, a discrete gate or transistor logic component, a discrete hardware component, or any combination thereof.

It is to be appreciated that the wireless device 110 may include one or more additional components (not shown) in the receive path between the low-noise amplifier 130 and the processor 150. For example, in some implementations, the wireless device 110 may include an additional amplifier (not shown) between the low-noise amplifier 130 and the mixer 140.

The wireless device 110 may support wireless communication in multiple frequency bands. For example, the wireless device 110 may receive a first RF signal in the first frequency band via first antenna 120 using the receiver 115, and transmit a second RF signal in the second frequency band via the second antenna 160 using the transmitter 118, in which the first frequency band and the second frequency band may be different. In this example, the wireless device 110 may receive the first RF signal from a base station or another wireless device.

The wireless device 110 may also support multiple wireless technologies including any one or more of the following: fourth generation (4G) (e.g., long-term Evolution (LTE), fifth generation (5G), ultra wide band (UWB), Bluetooth, WiFi, and the like. In this example, the wireless device 110 may transmit the first RF signal and receive the second RF signal using different wireless technologies (e.g., different ones of the exemplary wireless technologies listed above) or the same wireless technology.

The wireless device 110 may transmit and receive RF signals using time divisional duplexing (TDD) and/or frequency division duplexing (FDD). For TDD, the wireless device 110 transmits and receives RF signals in separate time slots. For FDD, the wireless device 110 transmits and receives RF signals on different frequencies. It is to be appreciated that the wireless device 110 may support both TDD and FDD.

A challenge with using multiple antennas on the wireless device 110 is antenna coupling between the first antenna 120 and the second antenna 160, in which a portion of the energy of the second RF signal transmitted from the second antenna 160 is coupled to the first antenna 120. The portion of the energy of the second RF signal coupled to the first antenna 120 may interfere with reception of the first RF signal at the receiver 115 (i.e., acts as a jammer signal at the receiver 115). The antenna coupling (also referred to as antenna-to-antenna coupling) may be unavoidable due to, for example, the compact form of the wireless device 100 which places the antennas 120 and 160 in close proximity to each other.

In cases where the first RF signal and the second RF signal are in different frequency bands, the inference from the second RF signal may be referred to as crosstalk interference between the antennas 120 and 160. In these cases, the first filter 125 may mitigate the interference by attenuating the second RF signal received by the first antenna 120 (i.e., the first filter 125 may be configured to reject RF signals outside the first frequency band). However, even with the attenuation, the interference due to antenna coupling may pose a problem at the receiver 115. In cases where the first RF signal and the second RF signal are in the same frequency band (i.e., the first frequency band and the second frequency band are the same) or the first RF signal and the second RF signal are in the same 3GPP defined band (e.g., the first RF signal is in the FDD TX portion of the 3GPP defined band and the second RF signal is in the FDD RX portion of the 3GPP defined band, or vice versa), the inference from the second RF signal may be referred to as self interference or in-band interference.

The wireless device 110 may employ one or more features to mitigate the effects of interference due to antenna coupling. Filters may be used to mitigate interference due to antenna coupling. However, filters suffer from a tradeoff between jammer rejection, which attenuates the jammer level to sustainable values, and filter insertion loss, which can severely limit the receiver sensitivity, and hence the cell coverage in all cases. To avoid this tradeoff, several features can be used to mitigate the interference due to antenna coupling. In one example, one or more components (e.g., the low-noise amplifier 130) in the receiver 115 may be configured to selectively operate in a high-linearity mode when certain conditions are met (e.g., channel frequencies combinations that may fall in band of the desired signal and create sensitivity loss). In this example, the wireless device 110 may enable the high-linearity mode to mitigate the interference due to antenna coupling. However, operating the one or more components in the high-linearity mode may lead to a higher noise figure (NF), which may reduce sensitivity.

In another example, the wireless device 110 may selectively perform non-linear interference cancellation (NLIC). The NLIC may be performed by the processor 150 and/or another component on the wireless device 110. In this example, the wireless device 110 may enable the NLIC to mitigate the interference due to antenna coupling. However, enabling the NLIC may lead to increased power consumption.

Other features to mitigate the effects of interference due to antenna coupling may include increasing the ADC rate of the ADC 145, employing a harmonic rejection mixer (HRM), and/or tighter second order input intercept point (TxIIP2) specifications at the receiver. However, employing any one of these features may increase power consumption, receiver complexity, and/or degradation in main performance as NF.

Thus, the wireless device 110 may employ one or more of the above features to mitigate the effects of interference due to antenna coupling. However, this comes at the expense of higher NF in the case of the high-linearity mode and increased power consumption for the other features.

In some cases, the antenna coupling between the first antenna 120 and the second antenna 160 may be relatively low (e.g., the isolation between the first antenna 120 and the second antenna 160 may be better than expected). In these cases, the interference due to antenna coupling may be relatively low, which allows one or more of the above features to be disabled and/or relaxed to reduce the NF and/or reduce power consumption. In other words, better isolation between the first antenna 120 and the second antenna 160 may be leveraged to reduce the NF and/or reduce power consumption by disabling and/or relaxing one or more of the above features. Accordingly, it is desirable to identify cases (i.e., scenarios) where the antenna coupling is relatively low (i.e., antenna isolation is better).

In some other cases, the antenna coupling may be high resulting in a large part of a signal being transferred from one antenna to one or more other antennas. However, additional filtering on the wireless device (e.g., phone) can reduce the jammer power at the input of the low-noise amplifier (LNA), which may allow some of the above features to be disabled, reducing power consumption and improving performance. Therefore, it is desirable to measure the antenna coupling and the filtering effect of additional components to have a good estimate of the jammer powers affecting the receiver.

To address this, aspects of the present disclosure provide circuits that may be added to the wireless device 110 to measure antenna coupling between two or more antennas. For example, in some implementations, the circuits may be configured to measure antenna coupling for different combinations of frequency bands and/or antennas, and store the measurements in a memory (e.g., non-volatile memory). These measurements may be used to identify cases (i.e., scenarios) where the antenna coupling is relatively low (i.e., antenna isolation is better). In these cases, one or more of the above features (e.g., high-linearity mode, NLIC, TxIIP2, HRM, and the like) used for mitigating interference due to antenna coupling may be disabled and/or relaxed to reduce the NF and/or reduce power consumption. In another example, the measurements may be used to determine when to enable (i.e., activate) one or more of the above features (e.g., high-linearity mode, NLIC, TxIIP2, HRM, and the like). Circuits according to aspects of the present disclosure may also be used to measure filter rejection (e.g., for certain combinations of frequency bands and/or antennas).

In some implementations, circuits according to aspects of the present disclosure may also be used to detect cases where the wireless device 110 potentially interferes with a coexisting signal (e.g., a radio altimeter device, UWB signal, and/or the like) operating in a certain frequency band. In response to detecting the coexisting signal, the wireless device 110 may take action to avoid interfering with the coexisting signal such as ceasing transmissions in the frequency band of the coexisting signal or reducing transmission power in the frequency band of the coexisting signal.

The above features of the present disclosure and other features of the present disclosure are discussed further below.

Figure 2:
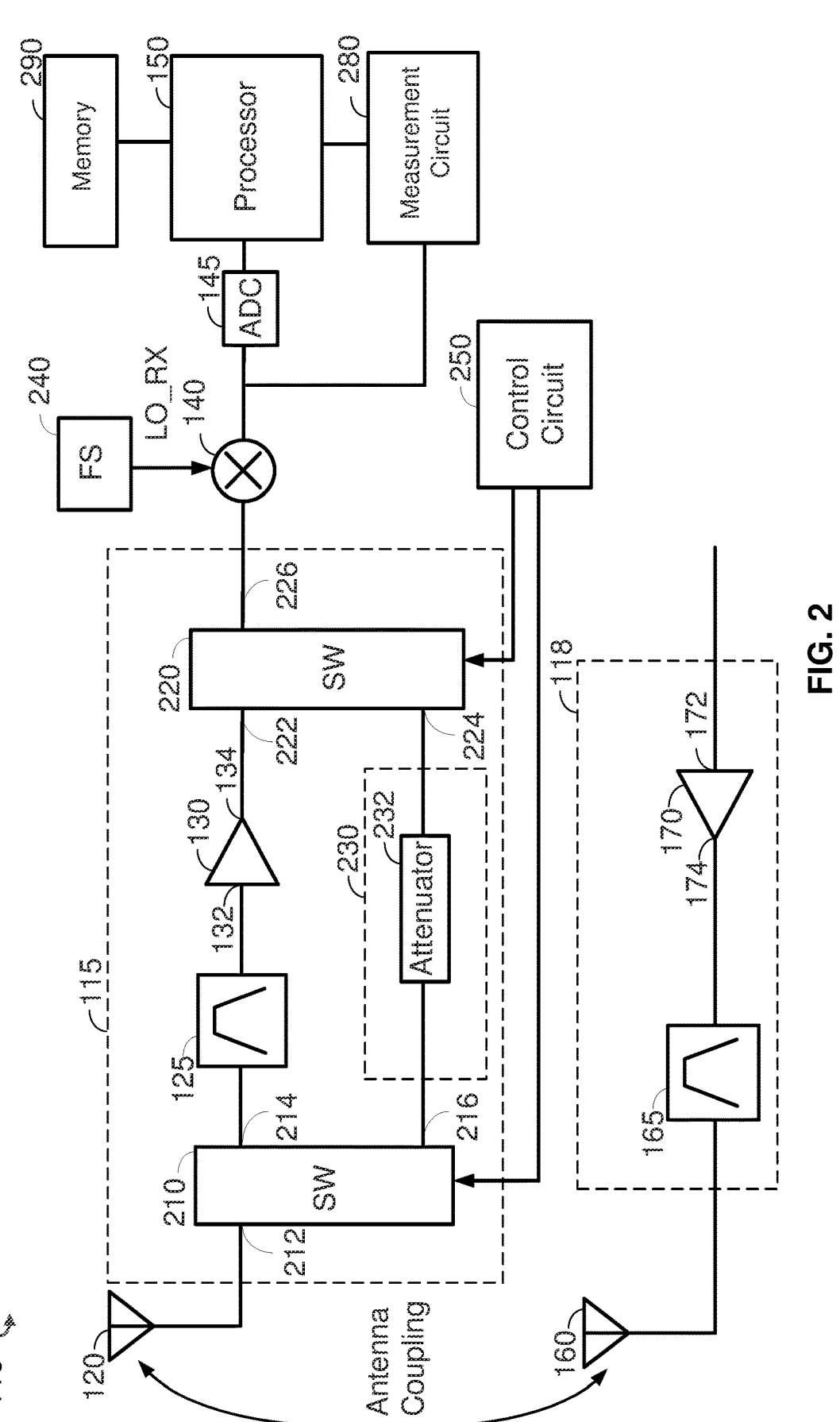
FIG. 2 shows an example of a wireless device including a bypass circuit for measuring antenna coupling according to certain aspects of the present disclosure.

FIG. 2 shows an example in which the wireless device 110 includes circuitry for measuring antenna coupling according to certain aspects. In this example, the wireless device 110 includes the components shown in FIG. 1. The wireless device 110 further includes a first switching circuit 210, a second switching circuit 220, a bypass circuit 230, a frequency synthesizer 240, and a control circuit 250 (also referred to as a controller). The bypass circuit 230 bypasses the first filter 125, as discussed further below.

The first switching circuit 210 has a first terminal 212, a second terminal 214, and a third terminal 216. A "terminal" may also be referred to as a port or another term. The first terminal 212 is coupled to the first antenna 120, the second terminal 214 is coupled to the first filter 125, and the third terminal 216 is coupled to the bypass circuit 230. The first switching circuit 210 is configured to selectively couple the first terminal 212 to the second terminal 214 or to the third terminal 216 under the control of the control circuit 250. The first switching circuit 210 may be implemented, for example, with a network of switches (e.g., switch transistors). The first switching circuit 210 may also be referred to as an antenna switch since it switches the first antenna 120 between the first filter 125 and the bypass circuit 230.

The second switching circuit 220 has a first terminal 222, a second terminal 224, and a third terminal 226. The first terminal 222 is coupled to the output 134 of the low-noise amplifier 130, the second terminal 224 is coupled to the bypass circuit 230, and the third terminal 226 is coupled to the mixer 140. The second switching circuit 220 is configured to selectively couple the first terminal 222 to the third terminal 226 or couple the second terminal 224 to the third terminal 226 under the control of the control circuit 250. The second switching circuit 220 may be implemented, for example, with a network of switches (e.g., switch transistors). The second switching circuit 220 may also be referred to as a multiplexer or another term.

In this example, the first filter 125 and the low-noise amplifier 130 are coupled in series between the second terminal 214 of the first switching circuit 210 and the first terminal 222 of the second switching circuit 220. Also, the bypass circuit 230 is coupled between the third terminal 216 of the first switching circuit 210 and the second terminal 224 of the second switching circuit 220. In operation, the control circuit 250 may selectively couple the first filter 125 and the low-noise amplifier 130 between the first antenna 120 and the mixer 140, or couple the bypass circuit 230 between the first antenna 120 and the mixer 140. To couple the first filter 125 and the low-noise amplifier 130 between the first antenna 120 and the mixer 140, the control circuit 250 causes the first switching circuit 210 to couple the first terminal 212 to the second terminal 214 and causes the second switching circuit 220 to couple the first terminal 222 to the third terminal 226. To couple the bypass circuit 230 between the first antenna 120 and the mixer 140, the control circuit 250 causes the first switching circuit 210 to couple the first terminal 212 to the third terminal 216 and causes the second switching circuit 220 to couple the second terminal 224 to the third terminal 226. In this case, the bypass circuit 230 bypasses the first filter 125 allowing RF signals to be measured without filter rejection by the first filter 125, as discussed further below.

In certain aspects, the bypass circuit 230 may be broadband (e.g., implemented generally via an attenuator and a bypass path) to allow for passing a signal within a wide frequency range but with a gain level sufficient to allow for processing of the signal by downstream components (e.g., mixer, amplifier, etc.). In some implementations, the bypass circuit 230 may include an attenuator. In this regard, FIG. 2 shows an example in which the bypass circuit 230 includes an attenuator 232 configured to attenuate RF signals passing through the bypass circuit 230. The attenuator 232 may be implemented with a resistor attenuator including one or more resistors (e.g., arranged in an "L" configuration, a "T" configuration, a "pi" configuration, or the like), or another type of attenuator. In certain aspects, the attenuator 232 may have a gain equal to or less than −3 dB, equal to or less than −6 dB, equal to or less than −12 dB, or equal to or less than −20 dB.

As discussed further below, the attenuator 232 may be used to attenuate a high-magnitude RF signal that would otherwise saturate components in the receive path located downstream of the bypass circuit 230. Such components may include the mixer 140 and/or an additional amplifier (not shown in FIG. 2) in the receive path. Another benefit of the attenuator 232 is that the attenuator 232 (e.g., resistor attenuator) has a wide (i.e., broad) frequency range. In other words, the attenuator 232 provides the bypass circuit 230 with broadband attenuation. This allows antenna coupling to be measured over a wide (i.e., broad) frequency range, as discussed further below. In certain aspects, the attenuator 232 may be a variable attenuator with a tunable attenuation that can be tuned by the control circuit 250. In some implementations, the downstream components in the receive path may be capable of processing the RF signal without saturating (e.g., the magnitude of the RF signal is not high enough to cause saturation). In these implementations, the bypass circuit 230 may include a bypass path between the input and output of the bypass circuit 230 that passes the RF signal without the attenuator 232 (e.g., the bypass path may have a gain of approximately zero dB).

In this example, the frequency synthesizer 240 is configured to generate the local oscillator signal (labeled "LO_RX") for the mixer 140. In some implementations, the frequency synthesizer 240 may include one or more phase-locked loops (PLLs). In certain aspects, the frequency synthesizer 240 may be configured to tune the frequency of the local oscillator signal under the control of the control circuit 250. For example, the frequency synthesizer 240 may be configured to set the frequency of the local oscillator signal to any one of a number of different frequencies under the control of the control circuit 250.

Exemplary operations of the wireless device 110 will now be discussed according to certain aspects. In certain aspects, the control circuit 250 may selectively operate the wireless device 110 in a first mode or a second mode, as discussed further below.

In the first mode, the receiver 115 may receive a first RF signal in the first frequency band via the first antenna 120, in which the first RF signal may be transmitted to the wireless device 110 from a base station or another wireless device. In the first mode, the control circuit 250 causes the first switching circuit 210 and the second switching circuit 220 to couple the first filter 125 and the low-noise amplifier 130 between the first antenna 120 and the mixer 140, as discussed above. In this mode, the first filter 125 (e.g., bandpass filter) filters the first RF signal and the low-noise amplifier 130 amplifies the first RF signal. After filtering (e.g., bandpass filtering) and amplification, the mixer 140 mixes the first RF signal with the local oscillator signal to frequency down-convert the first RF signal. For example, the frequency synthesizer 240 may set the frequency of the local oscillator signal to a first frequency in the first frequency band to down-convert the first RF signal to a baseband signal, which may then be converted into a digital signal by the ADC 145 and processed by the processor 150 (e.g., to recover data and control information). The first mode may also be referred to as a functional mode, normal mode, or another term.

In the second mode, the receiver 115 may be used to measure antenna coupling between the first antenna 120 and the second antenna 160. In the second mode, the control circuit 250 causes the first switching circuit 210 and the second switching circuit 220 to couple the bypass circuit 230 between the first antenna 120 and the mixer 140, as discussed above. This causes the receive path between the first antenna 120 and the mixer 140 to bypass the first filter 125. In this regard, the second mode may also be referred to as the bypass mode. As discussed further below, the second mode allows the antenna coupling to be measured without filter rejection by the first filter 125.

In the second mode, the transmitter 118 transmits a second RF signal in the second frequency band via the second antenna 160. In one example, the second frequency band is different from the first frequency. However, it is to be appreciated that the second frequency band may be the same as the first frequency band in another example.

A portion of the energy of the second RF signal is received by the first antenna 120 due to the antenna coupling between the first antenna 120 and the second antenna 160. In the second mode, the second RF signal passes through the attenuator 232 in the bypass circuit 230. The attenuator 232 attenuates the second RF signal (i.e., attenuates the magnitude of the second RF signal). In this example, the magnitude of the second RF signal entering the bypass circuit 230 may be high and may saturate components in the receive path located downstream of the bypass circuit 230 if it is not attenuated by the attenuator 232. The magnitude of the second RF signal may be high due to, for example, lack of filter rejection by the first filter 125 (which is bypassed in the second mode) and/or the close proximity of the antennas 120 and 160. In certain aspects, the attenuator 232 has a broadband response that is not limited by the filter (e.g., filter 125) and LNA tuned load.

After attenuation, the wireless device 110 may measure the signal strength (e.g., magnitude) of the second RF signal, and use the measured signal strength to estimate the antenna coupling between the first antenna 120 and the second antenna 160. For example, the processor 150 may use the measured signal strength and the known attenuation of the attenuator 232 to estimate the power of the second RF signal at the first antenna 120. For example, the processor 150 may reference the measured signal strength of the second RF signal back to the first antenna 120 and estimate the power at the first antenna 120 based on the signal strength referenced to the first antenna 120. The processor 150 may reference the measured signal strength to the first antenna 120, for example, by subtracting, from the measured signal strength, the gain of the receive path between the location of the measurement and the first antenna 120. In this example, the gain of the receive path may be measured beforehand as part of reference gain measurements (e.g. performed in a testing facility). Note that the gain of the receive path includes the gain of the attenuator 232, which may be given by −X dB where X represents a number. The negative sign of the gain indicates that the attenuator 232 attenuates the RF signal. Thus, in this example, subtracting the gain of the attenuator 232 may be equivalent to adding X dB. Since the attenuator 232 is broadband, the gain of the attenuator 232 is approximately constant over a broad frequency range, and may therefore be reliably known over a broad frequency range.

The processor 150 may then estimate the antenna coupling based on a power difference between the power of the second RF signal at the first antenna 120 and the power of the second RF signal at the second antenna 160. In this example, the power at the second antenna 160 may be estimated using a power detector (not shown) coupled to the transmitter 118 and/or estimated based on the gain or output power of the power amplifier 170. The processor 150 may store the antenna coupling in a memory 290 coupled to the processor 150.

The signal strength measurement may be performed by the processor 150 and/or a measurement circuit 280 coupled to the receive path between the mixer 140 and the processor 150. For example, the measurement circuit 280 may measure the signal strength (e.g., magnitude) of the baseband signal (which is generated from the RF signal) in the receive path and communicate the measured signal strength to the processor 150. In this example, the signal strength of the baseband signal provides a measurement of the signal strength of the RF signal. In another example, the processor 150 may measure the signal strength in the digital domain after the ADC 145. In this example, the measurement circuit 280 may be omitted. Thus, the signal strength may be measured before or after the ADC 145.

In one example, the transmitter 118 may transmit the second RF signal to a base station in a sounding reference signal (SRS) time slot, in which the second RF signal includes an SRS. In this example, the base station receives the second RF signal and uses the SRS in the second RF signal to estimate the channel quality between the wireless device 110 and the base station. In this example, the wireless device 110 may also use the second RF signal to measure the antenna coupling between the first antenna 120 and the second antenna 160 in the manner discussed above. Thus, in this example, the wireless device 110 may leverage the SRS time slot to also measure the antenna coupling. As used herein, a "sounding reference signal" is a reference signal used by a base station (e.g., eNodeB, gNB, etc.) or an access point to estimate channel quality. It is to be appreciated that the second RF signal may also include one or more other signals in addition to the SRS.

Thus, in the second mode (i.e., bypass mode), the wireless device 110 routes the second RF signal received at the first antenna 120 through the bypass circuit 230 to measure antenna coupling without filter rejection by the first filter 125. After measuring the antenna coupling, the processor 150 may determine, based on the measured antenna coupling, whether to disable and/or relax one or more of the features (e.g., high-linearity mode, NLIC, TxIIP2, HRM, and the like) discussed above for mitigating interference due to antenna coupling. For example, the processor 150 may disable and/or relax one or more of the above features if the measured antenna coupling is equal to or below a certain threshold. In another example, one or more of the above features may be disabled (e.g., as a default setting) and the measured antenna coupling may be used to determine whether to enable (i.e., activate) one or more of the above features (e.g., high-linearity mode, NLIC, TxIIP2, HRM, and the like). In this example, the processor 150 may enable one or more of the above features if the measured antenna coupling is above a threshold.

Since the bypass circuit 230 bypasses the first filter 125, the bypass circuit 230 may also be used to estimate the frequency rejection characteristics of the first filter 125. For example, the frequency rejection characteristics of the first filter 125 in the second frequency band may be estimated as follows according to certain aspects. First, the receiver 115 receives an RF signal in the second frequency band via the first antenna 120. The RF signal may be the second RF signal transmitted from the second antenna 160 or another RF signal in the second frequency band. In this example, the wireless device 110 makes a first measurement of the signal strength of the RF signal with the RF signal routed through the first filter 125, and makes a second measurement of the signal strength of the RF signal with the RF signal routed through the bypass circuit 230. The processor 150 may then characterize the filter rejection of the first filter 125 in the second frequency band based on a difference between the first measurement and the second measurement. Before taking the difference between the first measurement and the second measurement, the processor 150 may adjust the second measurement to account for the attenuation in the attenuator 232. For example, if the attenuation of the attenuator 232 is –X dB then the processor may add X dB to the second measurement to account for the attenuation.

In the above example, the control circuit 250 may route the RF signal through the first filter 125 for the first measurement by causing the first switching circuit 210 and the second switching circuit 220 to couple the first filter 125 between the first antenna 120 and the mixer 140, and route the RF signal through the bypass circuit 230 for the second measurement by causing the first switching circuit 210 and the second switching circuit 220 to couple the bypass circuit 230 between the first antenna 120 and the mixer 140. The first measurement and the second measurement may be performed by the measurement circuit 280 and/or the processor 150 according to various aspects. Also, in this example, the control circuit 250 may cause the frequency synthesizer 240 to tune the local oscillator signal of the mixer 140 to a frequency in the second frequency band to perform the measurements.

Figure 3:
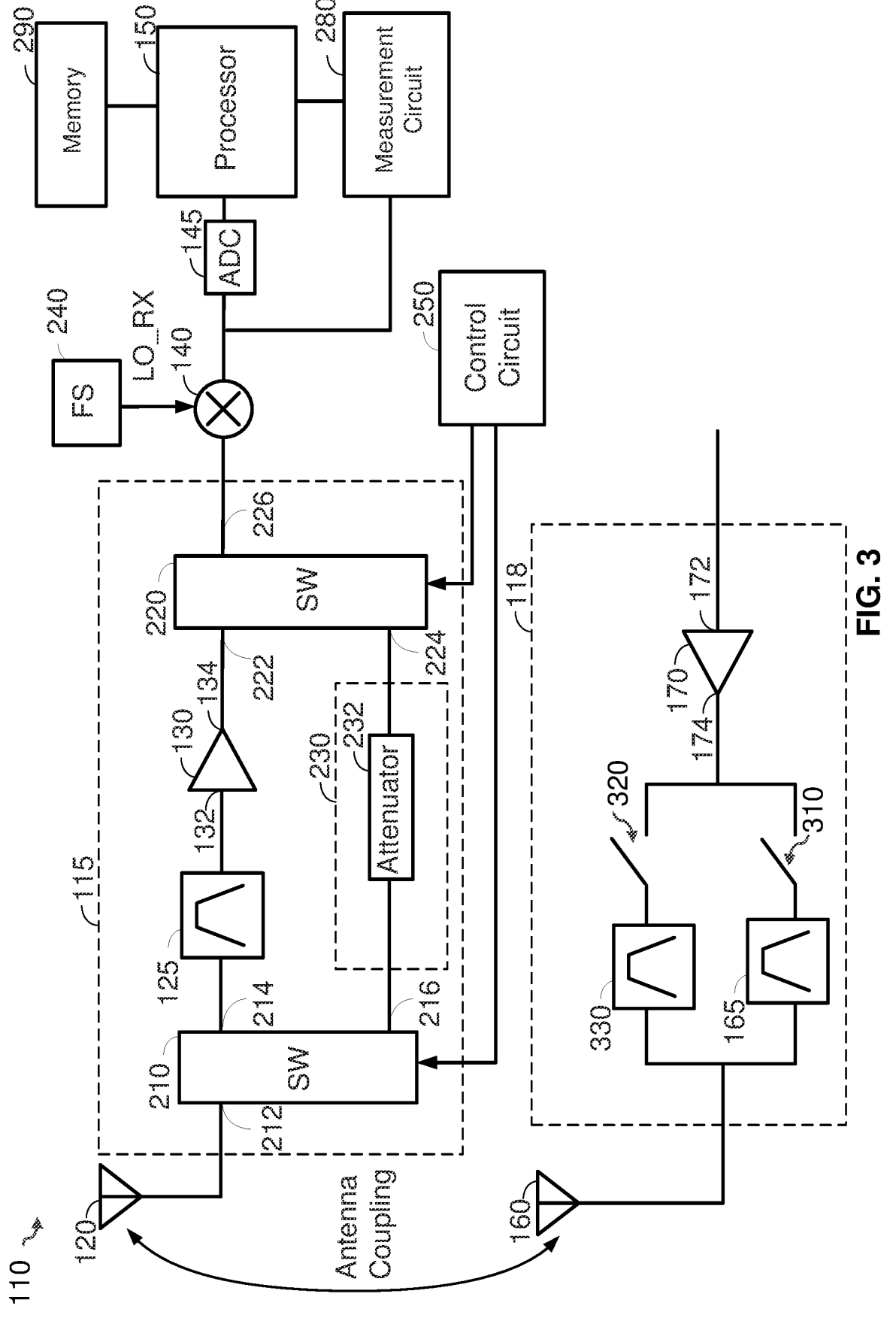
FIG. 3 shows another example of a wireless device including a bypass circuit according to certain aspects of the present disclosure.

In some implementations, the transmitter 118 may transmit in multiple frequency bands. In this regard, FIG. 3 shows an example in which the transmitter 118 also includes a third filter 330, a first switch 310, and a second switch 320. In certain aspects, the third filter 330 is a bandpass filter configured to pass RF signals in a third frequency band. The third frequency band may be within a sub-6 GHz band (e.g., any one of the LTE bands, 5G NR bands, WLAN bands (e.g., WiFi 2 or 5 GHz), and the like), a millimeter wave (mm-Wave) band, or the like. The third filter 330 may include an acoustic filter (e.g., SAW, BAW, or the like), an LC filter, a cavity filter, a combination thereof, and/or the like. In one example, the third frequency band is different from the second frequency band. In this example, the power amplifier 170 may be configured (e.g., tuned) to amplify signals in both the second frequency band and the third frequency band.

The first switch 310 is coupled between the second filter 165 and the output 174 of the power amplifier 170, and the second filter 165 is coupled between the first switch 310 and the second antenna 160. The second switch 320 is coupled between the third filter 330 and the output 174 of the power amplifier 170, and the third filter 330 is coupled between the second switch 320 and the second antenna 160. Each of the switches 310 and 320 may be implemented with a switch transistor or another type of switch.

In this example, the transmitter 118 may selectively transmit RF signals in the second frequency band or the third frequency band. To transmit in the second frequency band, the control circuit 250 turns on the first switch 310 and turns off the second switch 320, which couples the second filter 165 between the power amplifier 170 and the second antenna 160. To transmit in the third frequency band, the control circuit 250 turns off the first switch 310 and turns on the second switch 320, which couples the third filter 330 between the power amplifier 170 and the second antenna 160.

In this example, the wireless device 110 may measure the antenna coupling between the antennas 120 and 160 for the second frequency band and the third frequency band. To measure the antenna coupling for the second frequency band, the control circuit 250 turns on the first switch 310 and turns off the second switch 320, and the transmitter 118 transmits the second RF signal in the second frequency band. The wireless device 110 may then measure the antenna coupling using the bypass circuit 230 in the receiver 115, as discussed above.

To measure the antenna coupling for the third frequency band, the control circuit 250 turns off the first switch 310 and turns on the second switch 320. The power amplifier 170 receives a third RF signal in the third frequency band (e.g., from a mixer), amplifies the third RF signal, and output the third RF signal to the third filter 330. The third RF signal is filtered by the third filter 330 and transmitted via the second antenna 160. The receiver 115 receives a portion of the energy of the third RF signal via the first antenna 120, routes the third RF signal through the bypass circuit 230, and measures the signal strength of the third RF signal in the manner discussed above according to certain aspects. The processor 150 may then estimate the antenna coupling for the third frequency band based on the measured signal strength, and store the antenna coupling for the third frequency band in the memory 290.

Figure 4:
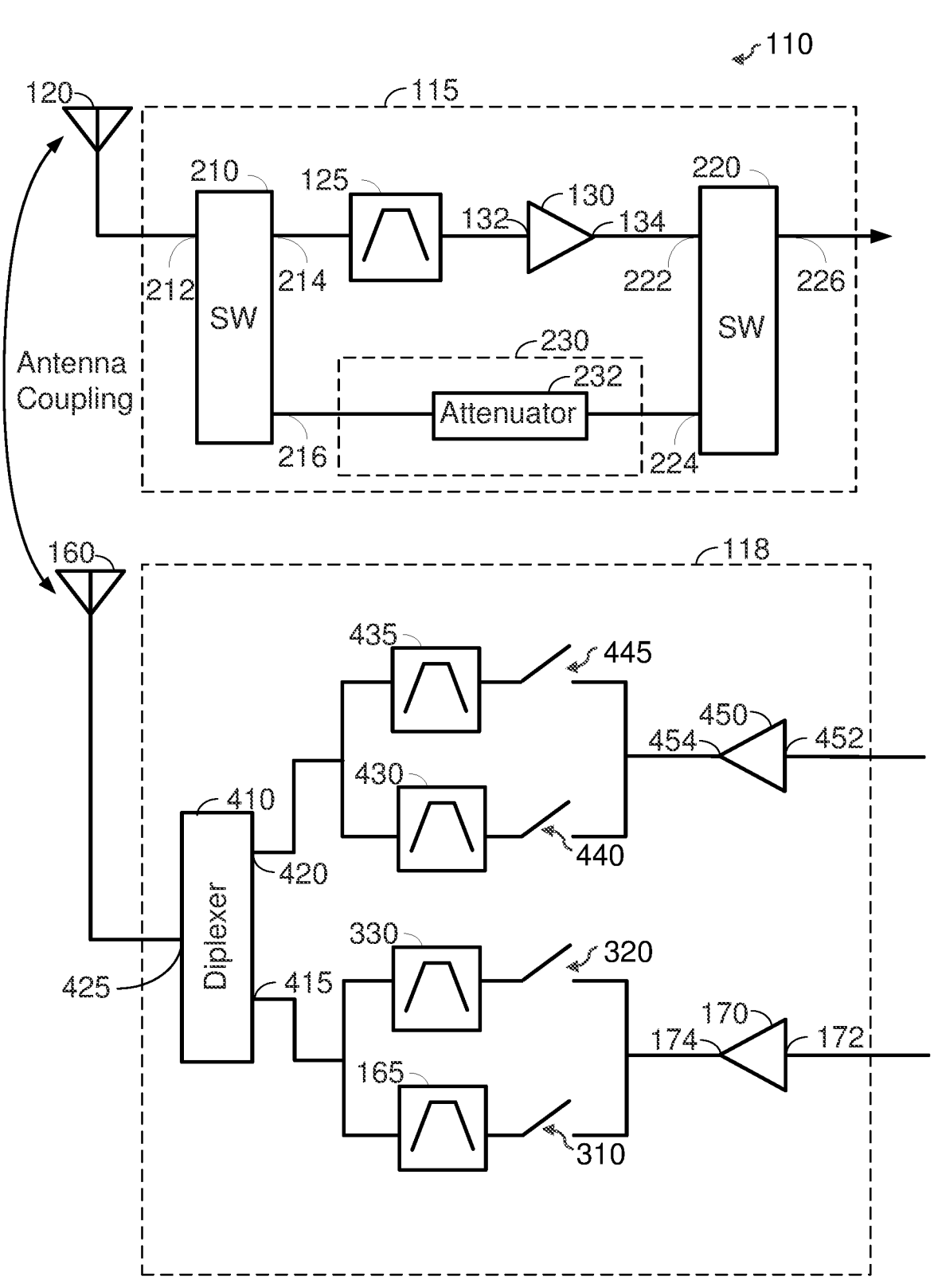
FIG. 4 shows yet another example of a wireless device including a bypass circuit according to certain aspects of the present disclosure.

FIG. 4 shows another example of the wireless device 110 according to certain aspects. In this example, the transmitter 118 includes the second filter 165, the third filter 330, the first switch 310, the second switch 320, and the power amplifier 170 discussed above. The transmitter 118 also includes a fourth filter 430, a fifth filter 435, a third switch 440, a fourth switch 445, a second power amplifier 450, and a diplexer 410. The second power amplifier 450 has an input 452 and an output 454, in which the second power amplifier 450 is configured to receive an RF signal at the input 452, amplify the RF signal, and output the amplified RF signal at the output 454. In the discussion below, the power amplifier 170 is referred to as the first power amplifier.

In certain aspects, the fourth filter 430 is a bandpass filter configured to pass RF signals in a fourth frequency band, and the fifth filter 434 is a bandpass filter configured to pass RF signals in a fifth frequency band. Each of the frequency bands may be within a sub-6 GHz band (e.g., any one of the LTE bands, 5G NR bands, WLAN bands (e.g., WiFi 2 or 5 GHz), and the like), a millimeter wave (mmWave) band, or the like. Each of the filters 430 and 435 may include an acoustic filter (e.g., SAW, BAW, or the like), an LC filter, a cavity filter, a combination thereof, and/or the like. In one example, the fourth frequency band may be different from the fifth frequency band. In this example, the second power amplifier 450 may be configured (e.g., tuned) to amplify signals in both the fourth frequency band and the fifth frequency band.

The diplexer 410 has a first terminal 415, a second terminal 420, and a third terminal 425 coupled to the second antenna 160. In certain aspects, the diplexer 410 is configured to couple the first terminal 415 to the third terminal 425 for RF signals within a first frequency range, and couple the second terminal 420 to the third terminal 425 for RF signals within a second frequency range, in which the first frequency range and the second frequency range are different. Thus, the diplexer 410 is configured to couple RF signals in the first frequency range and RF signals in the second frequency range to a common antenna (i.e., the second antenna 160). In one example, the second frequency band and the third frequency band are within the first frequency range, and the fourth frequency band and the fifth frequency band are within the second frequency range.

In this example, the second filter 165 is coupled between the first switch 310 and the first terminal 415 of the diplexer 410, and the third filter 330 is coupled between the second switch 320 and the first terminal 415 of the diplexer 410.

Also, in this example, the third switch 440 is coupled between the fourth filter 430 and the output 454 of the second power amplifier 450, and the fourth filter 430 is coupled between the third switch 440 and the second terminal 420 of the diplexer 410. The fourth switch 445 is coupled between the fifth filter 435 and the output 454 of the second power amplifier 450, and the fifth filter 435 is coupled between the fourth switch 445 and the second terminal 420 of the diplexer 410. Each of the switches 440 and 445 may be implemented with a switch transistor or another type of switch.

In this example, the transmitter 118 may selectively transmit RF signals in the second frequency band, the third frequency band, the fourth frequency band, or the fifth frequency band. Transmission in the second frequency band and the third frequency band are discussed above with reference to FIG. 3. In this example, the second RF signal and the third RF signal are coupled to the second antenna 160 through the diplexer 410.

To transmit in the fourth frequency band, the control circuit 250 turns on the third switch 440 and turns off the fourth switch 345, which couples the second power amplifier 450 to the fourth filter 340. To transmit in the fifth frequency band, the control circuit 250 turns off the third switch 440 and turns on the fourth switch 445, which couples the second power amplifier 450 to the fifth filter 435. In this example, the fourth filter 430 and the fifth filter 435 are coupled to the second antenna 160 through the diplexer 410.

In this example, the wireless device 110 may measure the antenna coupling between the antennas 120 and 160 for the second frequency band and the third frequency band, as discussed above with reference to FIG. 3. The wireless device 110 may also measure the antenna coupling between the antennas 120 and 160 for the fourth frequency band and the fifth frequency band.

To measure the antenna coupling for the fourth frequency band, the control circuit 250 turns on the third switch 440 and turns off the fourth switch 445. The second power amplifier 450 receives a fourth RF signal in the fourth frequency band (e.g., from a mixer), amplifies the fourth RF signal, and outputs the fourth RF signal to the fourth filter 430. The fourth RF signal is filtered by the fourth filter 430 and transmitted via the second antenna 160. The receiver 115 receives a portion of the energy of the fourth RF signal via the first antenna 120, routes the fourth RF signal through the bypass circuit 230, and measures the signal strength of the fourth RF signal in the manner discussed above according to certain aspects. The processor 150 may then estimate the antenna coupling for the fourth frequency band based on the measured signal strength, and store the antenna coupling for the fourth frequency band in the memory 290.

To measure the antenna coupling for the fifth frequency band, the control circuit 250 turns off the third switch 440 and turns on the fourth switch 445. The second power amplifier 450 receives a fifth RF signal in the fifth frequency band (e.g., from a mixer), amplifies the fifth RF signal, and outputs the fifth RF signal to the fifth filter 435. The fifth RF signal is filtered by the fifth filter 435 and transmitted via the second antenna 160. The receiver 115 receives a portion of the energy of the fifth RF signal via the first antenna 120, routes the fifth RF signal through the bypass circuit 230, and measures the signal strength of the fifth RF signal in the manner discussed above according to certain aspects. The processor 150 may then estimate the antenna coupling for the fifth frequency band based on the measured signal strength, and store the antenna coupling for the fifth frequency band in the memory 290.

Thus, the wireless device 110 may measure the antenna coupling for each one of the second, third, fourth, and fifth frequency bands, and store the antenna coupling for each frequency in the memory 290. Since the attenuator 232 is broadband, the gain of the attenuator 232 may be approximately constant over the second, third, fourth, and fifth frequency bands. For each frequency band, the processor 150 may determine, based on the measured antenna coupling for the frequency band, whether to disable and/or relax one or more of the features (e.g., high-linearity mode, NLIC, TxIIP2, HRM, and the like) discussed above for mitigating interference due to antenna coupling. For example, for each frequency band, the processor 150 may disable and/or relax one or more of the above features if the measured antenna coupling for the frequency band is equal to or below a certain threshold.

It is to be appreciated that the transmitter 118 is not limited to the exemplary implementations shown in FIGS. 2, 3, and 4.

Figure 5:
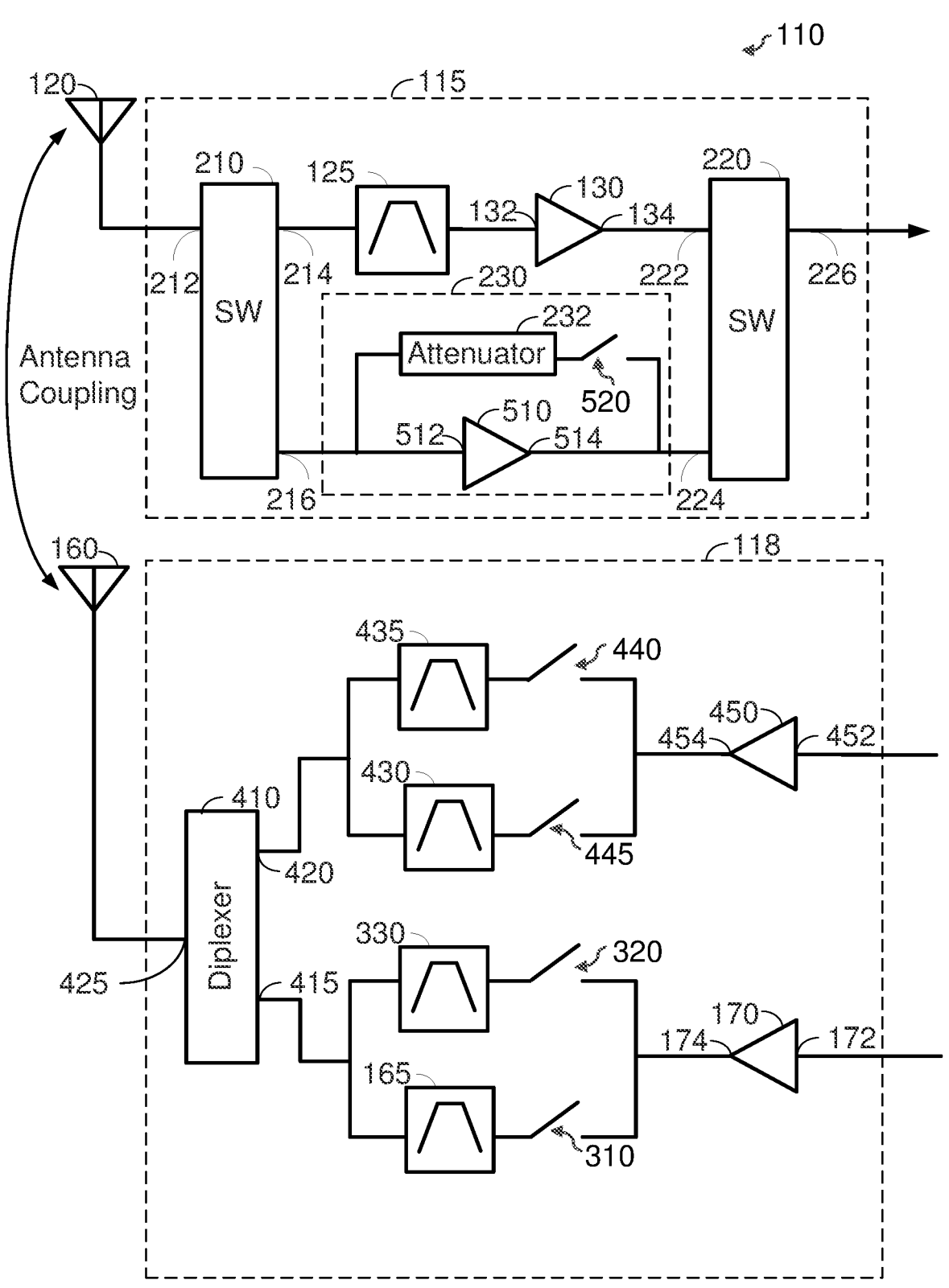
FIG. 5 shows an example of a bypass circuit including a bypass low-noise amplifier according to certain aspects of the present disclosure.

It is to be appreciated that, in some implementations, the bypass circuit 230 may include one or more additional components in addition to the attenuator 232. In this regard, FIG. 5 shows an example in which the bypass circuit 230 also includes a bypass low-noise amplifier 510. As discussed further below, the bypass low-noise amplifier 510 may be used to increase the sensitivity of the bypass circuit 230 for certain signals and/or provide a copy of the low-noise amplifier 130 without filter rejection by the first filter 125.

The bypass low-noise amplifier 510 has an input 512 and an output 514. In the example in FIG. 5, the input 512 is coupled to the third terminal 216 of the first switching circuit 210, and the output 514 is coupled to the second terminal 224 of the switching circuit 220. The bypass low-noise amplifier 510 is configured to receive an RF signal at the input 512, amplify the RF signal, and output the amplified RF signal at the output 514. In certain aspects, the bypass low-noise amplifier 510 is configured (e.g., tuned) to amplify an RF signal within a certain frequency band. In one example, the frequency band of the bypass low-noise amplifier 510 includes the first frequency band. In this example, the bypass low-noise amplifier 510 may be a copy of the low-noise amplifier 130 with approximately the same gain. In another example, the frequency band of the bypass low-noise amplifier 510 may be a wide (i.e., broad) frequency band covering multiple frequency bands (e.g., any one or more of the first, second, third, fourth, and fifth frequency bands).

In the example in FIG. 5, the bypass circuit includes a switch 520, in which the attenuator 232 and the switch 520 are coupled in series between the third terminal of the first switching circuit 210 and the second terminal 224 of the second switching circuit 220. As discussed further below, the switch 520 may be used by the control circuit 250 to selectively enable or disable the attenuation path of the bypass circuit 230.

In the second mode (i.e., bypass mode), the control circuit 250 controls whether the RF signal passing through the bypass circuit 230 is attenuated by the attenuator 232 or amplified by the bypass low-noise amplifier 510. In one example, the control circuit 250 turns on the switch 520 and turns off the bypass low-noise amplifier 510 to enable the attenuation path of the bypass circuit 230. In this case, the attenuator 232 attenuates the RF signal passing through the bypass circuit 230. In this example, the control circuit 250 turns off the switch 520 and enables the bypass low-noise amplifier 510 to amplify the RF signal.

In certain aspects, the control circuit 250 may cause the RF signal to be attenuated by the attenuator 232 for cases where the RF signal has a high magnitude and would saturate components in the receive path downstream of the bypass circuit 230 if it is not attenuated. The control circuit 250 may cause the RF signal to be amplified by the bypass low-noise amplifier 510 for causes where the RF signal is relatively weak and increased sensitivity is desired. For the example where the bypass low-noise amplifier 510 is a copy of the low-noise amplifier 130, the bypass low-noise amplifier 510 may be used to estimate the gain of the low-noise amplifier 130 without filter rejection by the first filter 125 (which is bypassed in this case). In this example, the control circuit 250 may cause the bypass low-noise amplifier 510 to amplify the RF signal. The wireless device 110 may then measure the signal strength of the amplified RF signal using any of the techniques discussed above, and the processor 150 may estimate the gain of the bypass low-noise amplifier 510 based on the measured signal strength. Assuming the low-noise amplifier 130 and the bypass low-noise amplifier 510 have approximately the same gain, the estimated gain of the bypass low-noise amplifier 510 may be used as an estimate of the gain of the low-noise amplifier 130.

In one example, the estimated gain of the low-noise amplifier 130 may be used in the characterization of the filter rejection of the first filter 125. In this example, the receiver 115 receives the RF signal via the first antenna 120. The RF signal may be any one of the RF signals discussed above or another RF signal. In this example, the wireless device 110 makes a first measurement of the signal strength of the RF signal with the RF signal routed through the first filter 125 and the low-noise amplifier 130, and makes a second measurement of the signal strength of the RF signal with the RF signal routed through the attenuator 232. The processor 150 may then characterize the filter rejection of the first filter 125 based on a difference between the first measurement and the second measurement. Before taking the difference, the processor 150 may adjust the second measurement to account for the attenuation in the attenuator 232. For example, if the attenuation of the attenuator 232 is –X dB then the processor may add X dB to the second measurement to account for the attenuation. Before taking the difference, the processor 150 may also adjust the first measurement to account for the gain of the low-noise amplifier 130. For example, the processor 150 may subtract the estimated gain of the low-noise amplifier 130 from the first measurement to account for the gain of the low-noise amplifier 130.

Examples of various use cases for the wireless device 110 will now be discussed according to certain aspects. However, it is to be appreciated that the exemplary use cases discussed below are for illustrative purposes only and that the wireless device 110 is not limited to these examples.

Figure 6A:
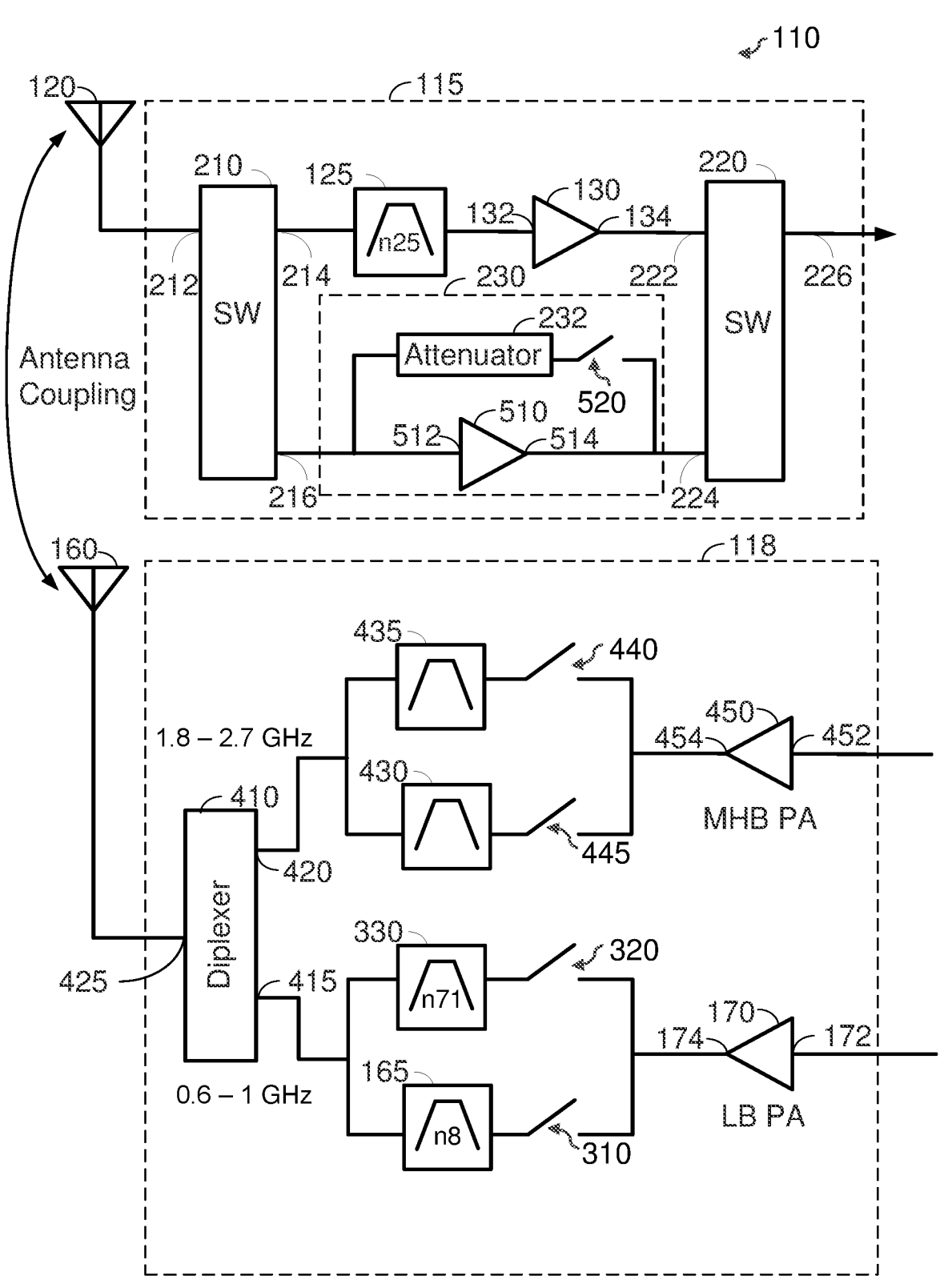
FIG. 6A illustrates a first exemplary use case of the wireless device according to certain aspects of the present disclosure.

FIG. 6A shows an exemplary use case (i.e., scenario) in which the transmitter 118 transmits in a low band (LB) and the low-noise amplifier 130 in the receiver 115 is tuned to operate in a mid-high band (MHB). In this example, the LB may cover a frequency range of 0.6 to 1 GHz and the MHB may cover a frequency range of 1.8 to 2.7 GHz. However, it is to be appreciated that the present disclosure is not limited to this example. In this example, the first power amplifier 170 may be configured to amplify signals in the LB and the second power amplifier 450 may be configured to amplify signals in the MHB. In this example, the diplexer 410 is configured to isolate the first power amplifier 170 from and the second power amplifier 450.

In this example, the second frequency band of the second filter 165 and the third frequency band of the third filter 330 are in the LB, and the fourth frequency band of the fourth filter 430 and the fifth frequency band of the fifth filter 435 are in the MHB. In the example shown in FIG. 6A, the second frequency band is n8 and the third frequency band is n71. However, it is to be appreciated that the second frequency band and the third frequency band are not limited to this example, and may include other frequency bands in the LB.

In this example, the low-noise amplifier 130 is tuned to operate in the MHB and the first frequency band (e.g., n25) of the first filter 125 is in the MHB. It is to be appreciated that the receiver 115 may also include one or more filters (not shown) and one or more low-noise amplifiers (not shown) configured to operate in the LB or another band. In this example, the receiver 115 may include a diplexer (not shown) to isolate the low-noise amplifier 130 and the first filter 125 from the one or more filters (not shown) and the one or more low-noise amplifiers (not shown) operating in the LB.

In the first mode (i.e., functional mode), the receiver 115 receives an RF signal (e.g., the first RF signal) in the MHB (e.g., from a base station or another wireless device). In this mode, the control circuit 250 may cause the frequency synthesizer 240 to tune the local oscillator signal of the mixer 140 to a frequency in the first frequency band (e.g., n25) to frequency down-convert the received RF signal to a baseband signal.

In the second mode (i.e., bypass mode), the wireless device 110 may measure antenna coupling between the first antenna 120 and the second antenna 160 for the scenario of LB transmission (i.e., LB jammer). To do this, the transmitter 118 transmits an RF signal in the LB via the second antenna 160 using the first power amplifier 170 for amplification, and the second filter 165 or the third filter 330 for filtering. A portion of the energy of the RF signal is received by the first antenna 120 due to the antenna coupling between the first antenna 120 and the second antenna 160. The control circuit 250 routes the RF signal through the attenuator 232 in the bypass circuit 230, which provides broadband attenuation. The control circuit 250 may also cause the frequency synthesizer 240 to tune the local oscillator signal of the mixer 140 to a frequency (e.g., 897.5 MHz) in the frequency band (e.g., the second frequency band or the third frequency band) of the transmitter 118 to perform the antenna coupling measurement.

After attenuation, the wireless device 110 may measure the signal strength (e.g., magnitude) of the RF signal using any of the techniques discussed above, and use the measured signal strength to estimate the antenna coupling between the first antenna 120 and the second antenna 160. For example, the processor 150 may use the measured signal strength and the known attenuation of the attenuator 232 to estimate the power of the second RF signal at the first antenna 120. For example, the processor 150 may reference the measured signal strength back to the first antenna 120 and estimate the power at the first antenna 120 based on the signal strength referenced to the first antenna 120. As discussed above, the processor 150 may reference the measured signal strength back to the first antenna 120 using reference gain measurements.

The processor 150 may then estimate the antenna coupling based on a power difference between the power of the second RF signal at the first antenna 120 and the power of the second RF signal at the second antenna 160. In this example, the power at the second antenna 160 may be estimated using a power detector (not shown) coupled to the transmitter 118 and/or estimated based on the gain or output power of the first power amplifier 170. The processor 150 may store the antenna coupling in a memory 290.

In the example in FIG. 6A, the transmitter 118 transmits in the LB and the low-noise amplifier 130 operates in the MHB. However, it is to be appreciated that the present disclosure is not limited to this example. In another exemplary use case (i.e., scenario), the transmitter 118 transmits in the MHB and the low-noise amplifier 130 operates in the MHB. In this regard, FIG. 6B shows an exemplary use case (i.e., scenario) in which the transmitter 118 transmits in the MHB and the low-noise amplifier 130 in the receiver 115 is tuned to operate in the MHB.

Figure 6B:
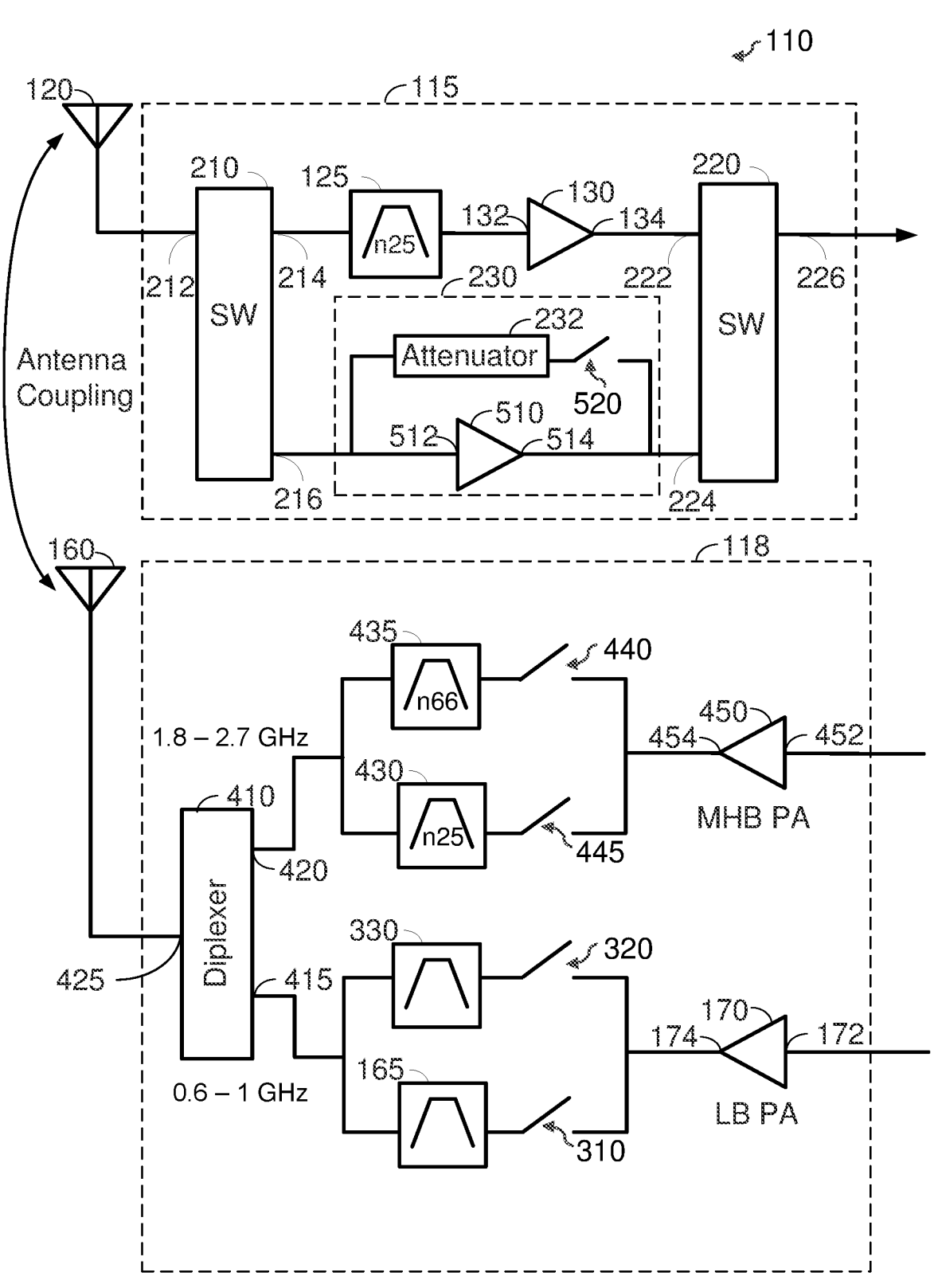
FIG. 6B illustrates a second exemplary use case of the wireless device according to certain aspects of the present disclosure.

In the example shown in FIG. 6B, the fourth frequency band is n25 and the fifth frequency band is n66. However, it is to be appreciated that the fourth frequency band and the fifth frequency band are not limited to this example, and may include other frequency bands in the MHB.

In the first mode (i.e., functional mode), the receiver 115 receives an RF signal (e.g., the first RF signal) in the MHB (e.g., from a base station or another wireless device). In this mode, the control circuit 250 may cause the frequency synthesizer 240 to tune the local oscillator signal of the mixer 140 to a frequency in the first frequency band (e.g., n25) to frequency down-convert the received RF signal to a baseband signal. In this example, the first frequency band is in the MHB, as discussed above.

In the second mode (i.e., bypass mode), the wireless device 110 may measure antenna coupling between the first antenna 120 and the second antenna 160 for the scenario of MHB transmission (i.e., MHB jammer). To do this, the transmitter 118 transmits an RF signal in the MHB via the second antenna 160 using the second power amplifier 450 for amplification, and the fourth filter 430 or the fifth filter 435 for filtering. A portion of the energy of the RF signal is received by the first antenna 120 due to the antenna coupling between the first antenna 120 and the second antenna 160. The control circuit 250 routes the RF signal through the attenuator 232 in the bypass circuit 230, which provides broadband attenuation. The control circuit 250 may also cause the frequency synthesizer 240 to tune the local oscillator signal of the mixer 140 to a frequency (e.g., 1882.5 MHz) in the frequency band (e.g., fourth frequency band or fifth frequency band) of the transmitter 118 to perform the antenna coupling measurement. The wireless device 110 may then measure the signal strength of the RF signal and estimate the antenna coupling based on the measured signal strength (e.g., in the manner discussed above with reference to FIG. 6A).

Figure 6C:
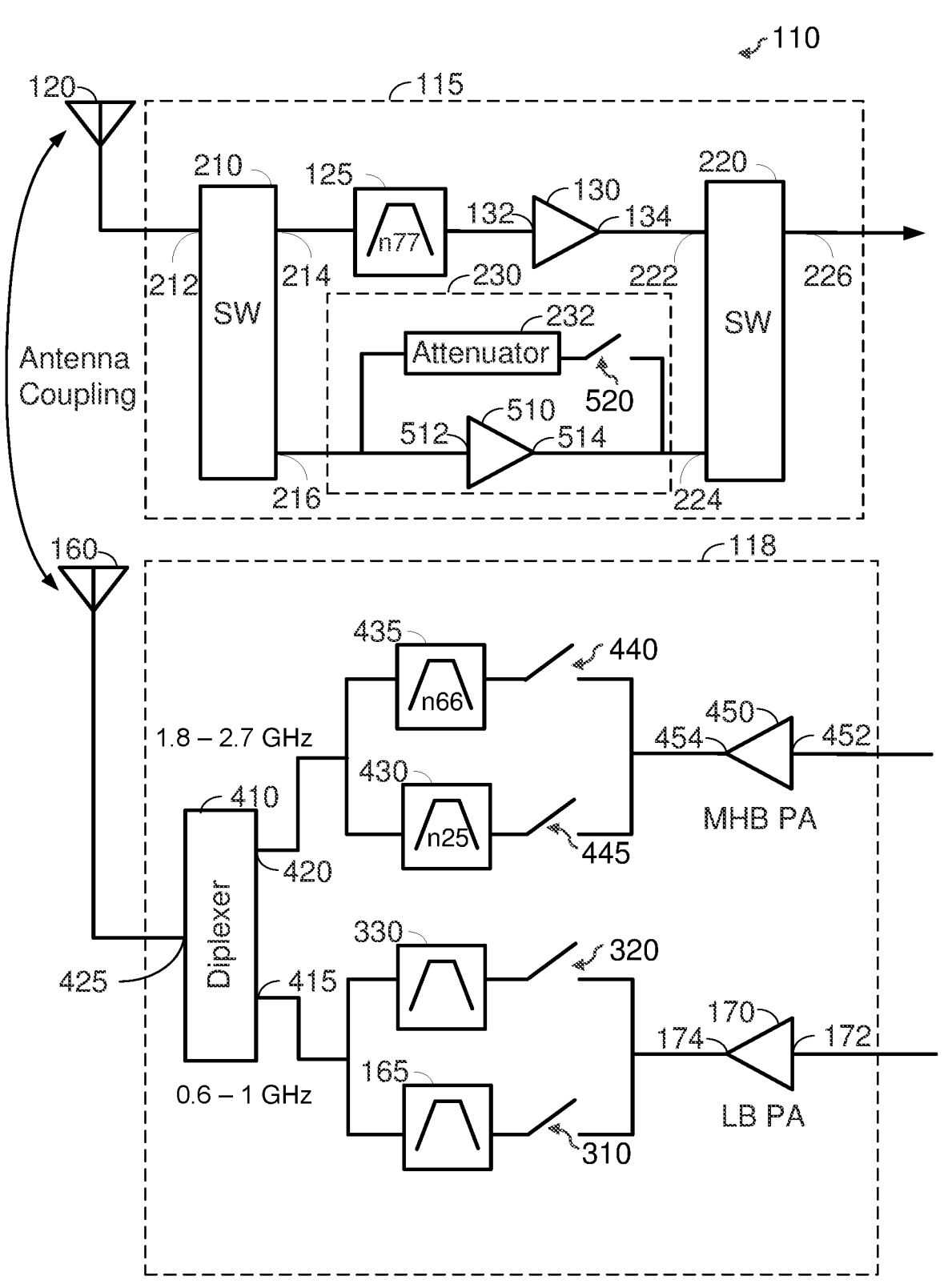
FIG. 6C illustrates a third exemplary use case of the wireless device according to certain aspects of the present disclosure.

FIG. 6C shows another exemplary use case (i.e., scenario) in which the transmitter 118 transmits in the MHB and the low-noise amplifier 130 in the receiver 115 is tuned to operate in the n77 band. In the example shown in FIG. 6C, the fourth frequency band is n3 and the fifth frequency band is n66. However, it is to be appreciated that the fourth frequency band and the fifth frequency band are not limited to this example.

In the first mode (i.e., functional mode), the receiver 115 receives an RF signal (e.g., the first RF signal) in the n77 band (e.g., from a base station or another wireless device). In this mode, the control circuit 250 may cause the frequency synthesizer 240 to tune the local oscillator signal of the mixer 140 to a frequency in the n77 band to frequency down-convert the received RF signal to a baseband signal.

In the second mode (i.e., bypass mode), the wireless device 110 may measure antenna coupling between the first antenna 120 and the second antenna 160 for the scenario of MHB transmission (i.e., MHB jammer). To do this, the transmitter 118 transmits an RF signal in the MHB via the second antenna 160 using the second power amplifier 450 for amplification, and the fourth filter 430 or the fifth filter 435 for filtering. A portion of the energy of the RF signal is received by the first antenna 120 due to the antenna coupling between the first antenna 120 and the second antenna 160. The control circuit 250 routes the RF signal through the attenuator 232 in the bypass circuit 230, which provides broadband attenuation. The control circuit 250 may also cause the frequency synthesizer 240 to tune the local oscillator signal of the mixer 140 to a frequency (e.g., 1.747 GHz) in the frequency band (e.g., fourth frequency band or fifth frequency band) of the transmitter 118 to perform the antenna coupling measurement. The wireless device 110 may then measure the signal strength of the RF signal and estimate the antenna coupling based on the measured signal strength (e.g., in the manner discussed above with reference to FIG. 6A).

The bypass circuit 230 may also be used to detect cases where the wireless device 110 potentially interferes with a coexisting signal operating in a certain frequency band. The coexisting signal may be a signal intended for another wireless device, a signal intended for another receiver on the wireless device 110, or the like. In other words, the wireless device 110 may coexists with other wireless devices in a radio environment and may take steps to avoid interfering with the signals (i.e., coexisting signals) of the other wireless device. The coexisting signal may include, for example, a radio altimeter signal, a UWB signal, a WiFi signal, a cellular vehicle-to-everything (CV2X) signal, and/or another signal.

In response to detecting the coexisting signal, the wireless device 110 may take action to avoid interfering with the coexisting signal such as ceasing transmissions in the frequency band of the coexisting signal or reducing transmission power in the frequency band of the coexisting signal. Detection of a coexisting signal using the bypass circuit 230 is discussed below according to certain aspects using an example of a radio altimeter signal. However, it is to be appreciated that the present disclosure is not limited to this example, and that bypass circuit 230 may be used to detect other coexisting signals such as, for example, a UWB signal.

Figure 7:
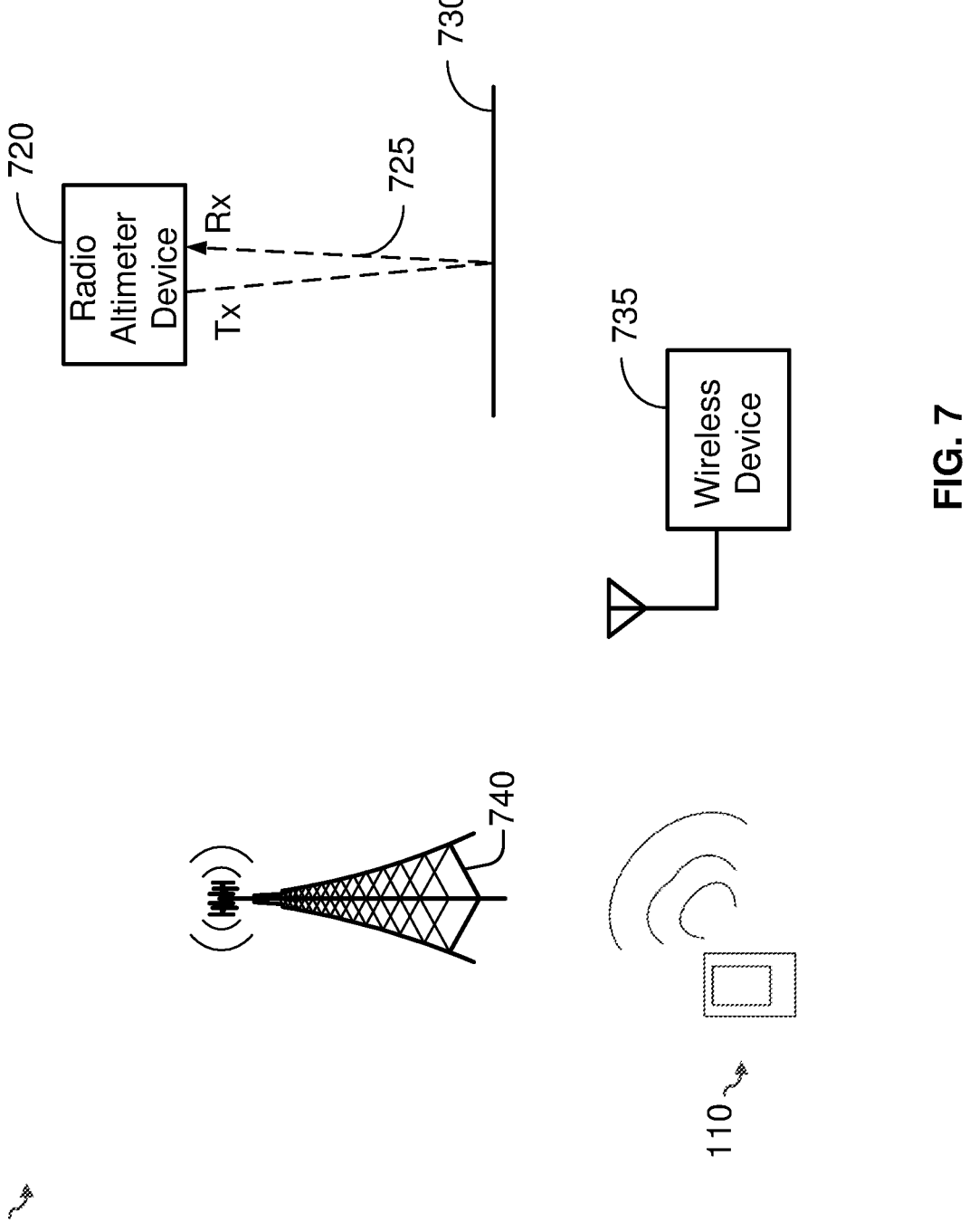
FIG. 7 shows an exemplary environment including a coexisting signal according to certain aspects of the present disclosure.

FIG. 7 shows an exemplary environment 710 in which the wireless device 110 may potentially interfere with a coexisting signal. In this example, the environment 710 may include a radio altimeter device 720 (e.g., onboard an airplane or another vehicle). The radio altimeter device 720 may be configured to transmit a radio altimeter signal 725 to the ground 730, which reflects the radio altimeter signal 725 back to the radio altimeter device 720. The radio altimeter device 720 may then estimate the height from the ground 730 based on the time it takes for the radio altimeter signal 732 to return to the radio altimeter device 720. The radio altimeter signal 732 may have a frequency band of 4.2 to 4.4 GHz or another frequency band. In this environment 710, RF transmissions from the wireless device 110 may interfere with the radio altimeter device 720.

FIG. 7 also shows an example of another wireless device 735 that may transmit a coexisting signal (e.g., UWB signal) with which the wireless device 735 may potentially interfere. In this example, the wireless device 110 may transmit an RF signal having a frequency that is close enough to the frequency of the coexisting signal to interfere with the coexisting signal. FIG. 7 also shows an example of a base station 740 that may be in wireless communication with the wireless device 110 (e.g., to provide wireless services). In this example, the base station 740 may also potentially interfere with a coexisting signal.

To address interference with a coexisting signal, the bypass circuit 230 according to certain aspects may be used to monitor for a coexisting signal such as a radio altimeter signal or another coexisting signal (e.g., UWB signal). If a coexisting signal is detected, then the wireless device 110 may take action to mitigate interference with the coexisting signal, as discussed further below.

Figure 8:
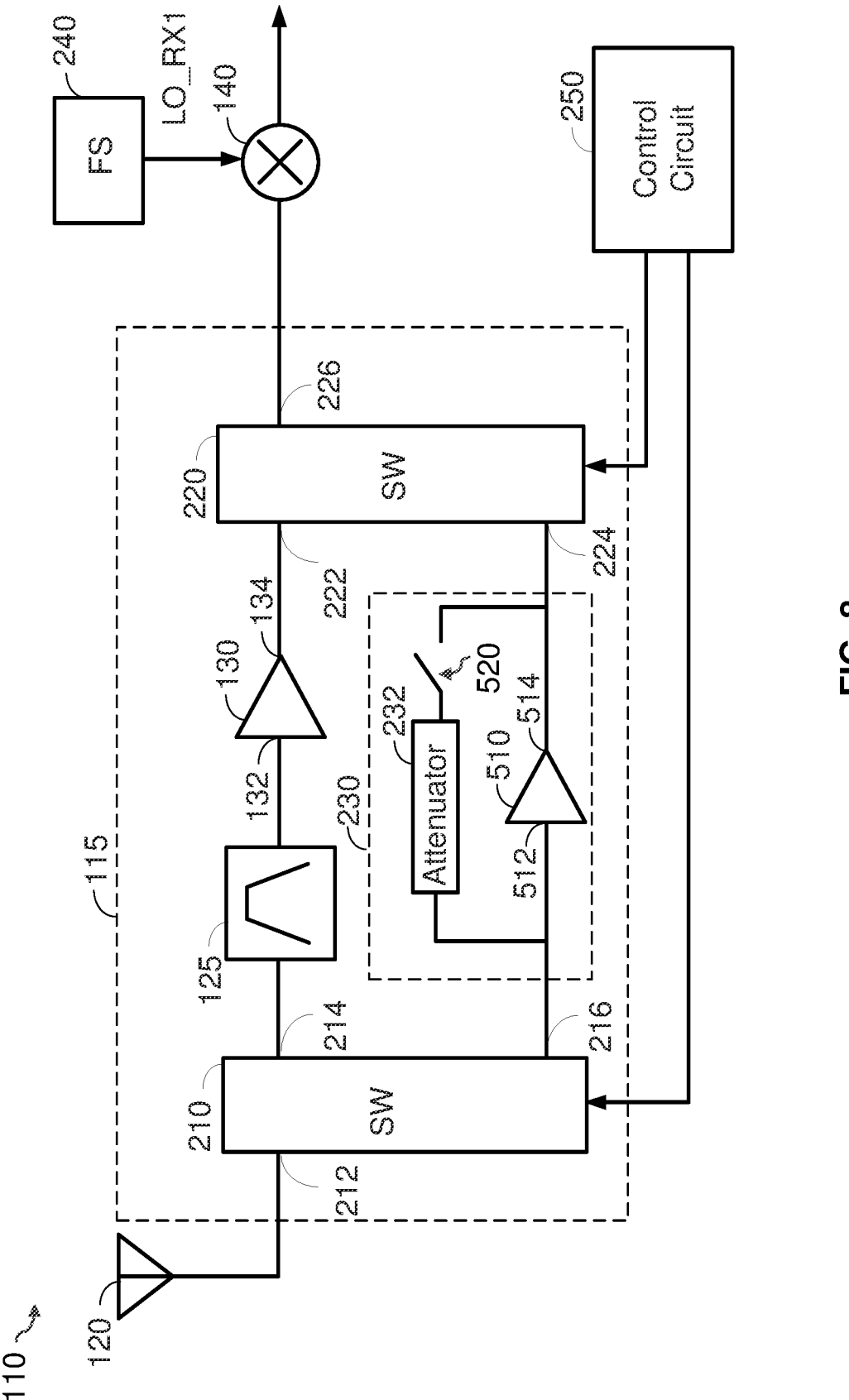
FIG. 8 shows an example of a wireless device configured to detect a coexisting signal according to certain aspects of the present disclosure.

In this regard, FIG. 8 shows an example in which the bypass circuit 230 may be used to monitor for coexisting signal (e.g., radio altimeter signal). To monitor for the coexisting signal, the control circuit 250 causes the first switching circuit 210 and the second switching circuit 220 to couple the bypass circuit 230 between the first antenna 120 and the mixer 140. The control circuit 250 also enables the bypass low-noise amplifier 510 to increase sensitivity, and disables the attenuation path (e.g., turns off the switch 520) in the bypass circuit 230. The sensitivity may be increased to increase detection sensitivity for the coexisting signal, which may be relatively weak. In this example, the bypass low-noise amplifier 510 is configured (i.e., tuned) to amplify signals in a frequency band including the frequency of the coexisting signal (e.g., radio altimeter signal).

In this example, the coexisting signal may be undetectable if routed through the first filter 125. This is because the filter rejection of the first filter 125 may attenuate the coexisting signal too much for the coexisting signal to be detected after filtering. Routing the coexisting signal through the bypass circuit 230 avoids this problem by bypassing the first filter 125. In addition, enabling the bypass low-noise amplifier 510 increases sensitivity, which improves detection of the coexisting signal (e.g., radio altimeter signal).

In this example, the control circuit 250 causes the frequency synthesizer 240 to tune the local oscillator signal of the mixer 140 to a frequency of the coexisting signal to down-convert the coexisting signal to a baseband signal. The measurement circuit 280 (not shown in FIG. 8) and/or the processor 150 may then measure the signal strength of the baseband signal to estimate the signal strength at the frequency of the coexisting signal. The processor 150 detects whether the coexisting signal is present based on the measured signal strength. For example, the processor 150 may detect the coexisting signal if the measured signal strength is equal to or above a threshold.

In response to detecting the coexisting signal, the processor 150 may take one or more of the following actions to mitigate interference with the coexisting signal. The processor 150 may cause the transmitter 118 to cease RF transmissions at frequencies within a frequency band of the coexisting signal. Alternatively, the processor 150 may cause the transmitter 118 to reduce RF transmission power at frequencies within a frequency band of the coexisting signal. In certain aspects, the processor 150 may cause the transmitter 118 to transmit a message to a base station (e.g., base station 740) informing the base station of the presence of the coexisting signal (e.g., radio altimeter signal). In response, the base station (e.g., base station 740) may avoid RF transmissions to the wireless device 110 at frequencies within a frequency band of the coexisting signal.

Figure 9:
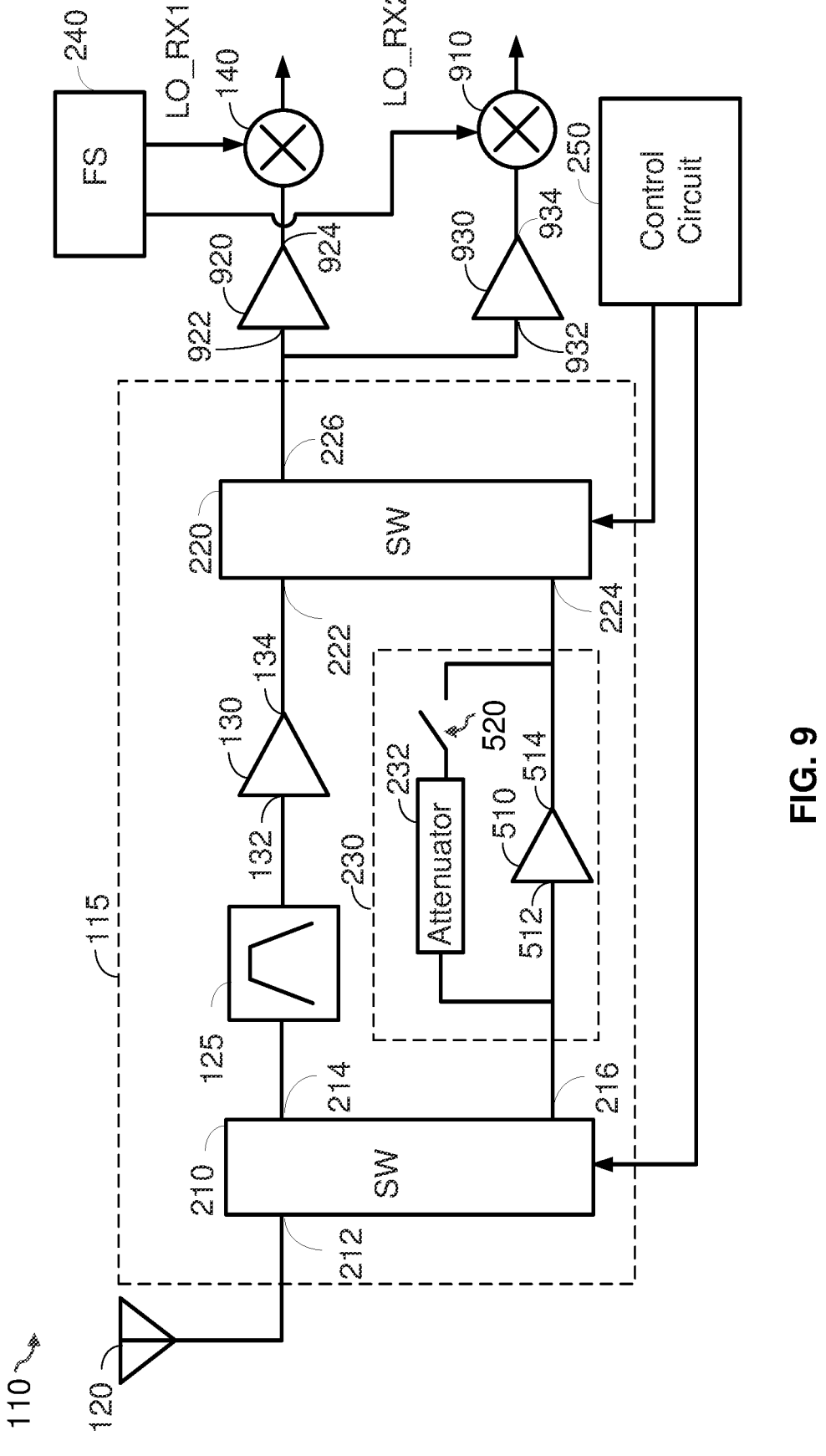
FIG. 9 shows an example of a wireless device configured to simultaneously detect a coexisting signal and receive an RF signal for communication according to certain aspects of the present disclosure.

In certain aspects, the wireless device 110 may be configured to simultaneously monitor for the coexisting signal and receive an RF signal for communication. The RF signal for communication may also be referred to as a third RF signal. This allows, for example, the wireless device 110 to monitor for a coexisting signal (e.g., radio altimeter signal) while receiving data traffic from the third RF signal. In this regard, FIG. 9 shows an example in which the wireless device 110 includes a second mixer 910 coupled to the third terminal 226 of the second switching circuit 220. In the discussion below, the mixer 140 is referred to as the first mixer 140.

In this example, the frequency synthesizer 240 is configured to output a first local oscillator signal (labeled "LO_RX1") to the first mixer 140, and a second local oscillator signal (labeled "LO_RX2") to the second mixer 910. Also, the bypass low-noise amplifier 510 may be configured (i.e., tuned) to amplify signals in the frequency band of the coexisting signal and the frequency band (e.g., n77 band) of the RF signal used for communication. The RF signal may be transmitted to the wireless device 110 from a base station (e.g., base station 740).

As shown in FIG. 9, the wireless device 110 may also include a first amplifier 920 and second amplifier 930. The first amplifier 920 has an input 922 coupled to the third terminal 226 of the second switching circuit 220 and an output 924 coupled to the first mixer 140. The second amplifier 930 has an input 932 coupled to the third terminal 226 of the second switching circuit 220 and an output 934 coupled to the second mixer 910. In this example, the first amplifier 920 and the second amplifier 930 may be used to provide different gains for the first mixer 140 and the second mixer 910.

During operation, the control circuit 250 causes the first switching circuit 210 and the second switching circuit 220 to couple the bypass circuit 230 between the first antenna 120 and the mixer 140. The control circuit 250 also enables the bypass low-noise amplifier 510. Thus, in this example, the RF signal and the coexisting signal, which are received concurrently (i.e., simultaneously) via the first antenna 120, are routed through the bypass circuit 230 and amplified by the bypass low-noise amplifier 510.

In this example, the frequency synthesizer 240 may tune the first oscillator signal (labeled "LO_RX1") of the first mixer 140 to a frequency in the frequency band (e.g., n77) of the RF signal to down-convert the RF signal to a baseband signal. The baseband signal may then be converted into a digital signal by the ADC 145 and processed by the processor 150 (e.g., to recover data and/or control information).

The frequency synthesizer 240 may tune the second oscillator signal (labeled "LO_RX2") of the second mixer 910 to a frequency (e.g., 4.35 GHz) of the coexisting signal to down-convert the coexisting signal to a baseband signal. The measurement circuit 280 (not shown in FIG. 9) and/or the processor 150 may then measure the signal strength of the baseband signal to estimate the signal strength at the frequency of the coexisting signal. The processor 150 detects whether the coexisting signal (e.g., radio altimeter signal) is present based on the measured signal strength. For example, the processor 150 may detect the coexisting signal if the measured signal strength is equal to or above a threshold. In response to detecting the coexisting signal, the processor 150 may take one or more of the actions discussed above with reference to FIG. 8.

Figure 10:
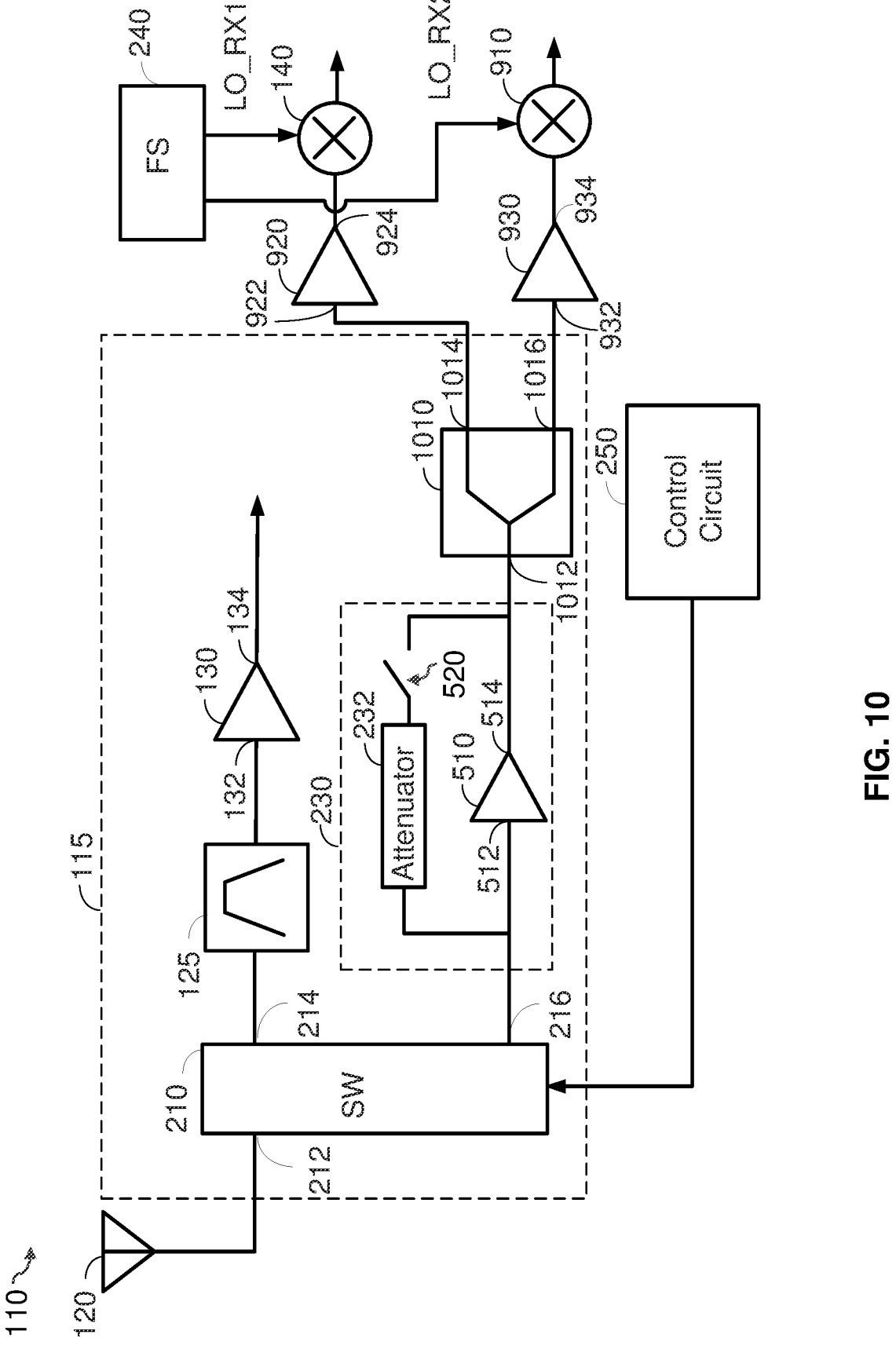
FIG. 10 shows another example of a wireless device configured to simultaneously detect a coexisting signal and receive an RF signal for communication according to certain aspects of the present disclosure.

FIG. 10 shows another example in which the wireless device 110 includes a power splitter 1010. In this example, the power splitter 1010 has an input 1012, a first output 1014 coupled to the input of first amplifier 920, and a second output 1016 coupled to the input of the second amplifier 930. In this example, the bypass circuit 230 is coupled between the third terminal 216 of the first switching circuit 210 and the input 1012 of the power splitter 1010. The power splitter 1010 is configured to receive the RF signal and the coexisting signal from the bypass circuit 230, and split their power between the first output 1014 and the second output 1016.

Figure 11:
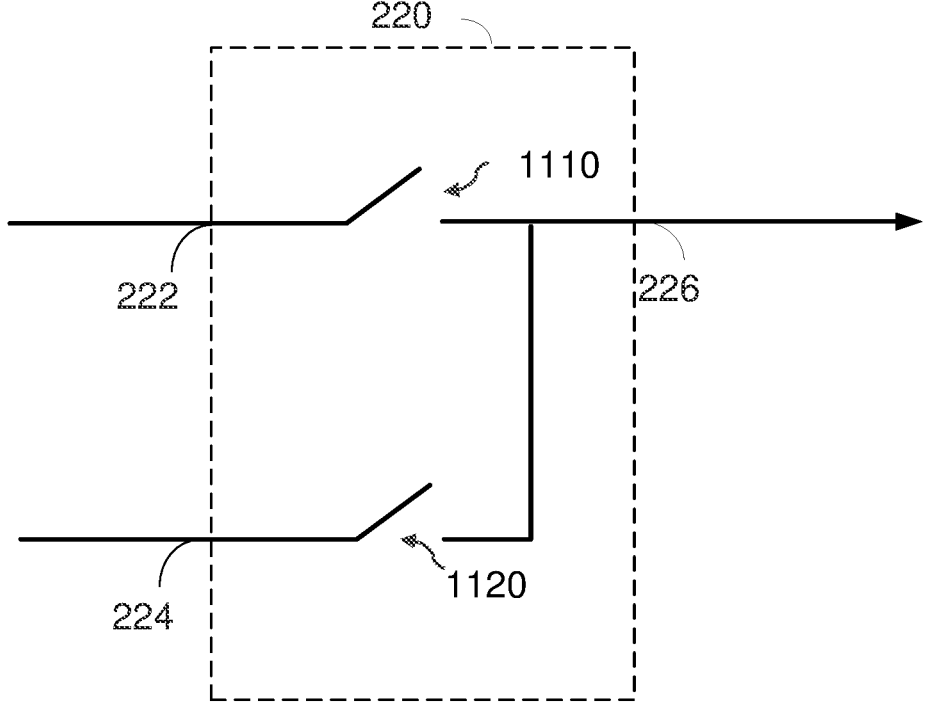
FIG. 11 shows an exemplary implementation of a switching circuit according to certain aspects of the present disclosure.

FIG. 11 shows an exemplary implementation of the second switching circuit 220 according to certain aspects. In this example, the second switching circuit 220 includes a first switch 1110 coupled between the first terminal 222 and the third terminal 226, and a second switch 1120 coupled between the second terminal 224 and the third terminal 226. The switches 1110 and 1120 may be controlled by the control circuit 250 (not shown in FIG. 11). In this example, the control circuit 250 turns on the first switch 1110 and turns off the second switch 1120 to couple the first terminal 222 to the third terminal 226, and turns on the second switch 1120 and turns off the first switch 1110 to couple the second terminal 224 to the third terminal 226. Each of the switches 1110 and 1120 may be implemented with a respective switch transistor, or another type of switch. It is to be appreciated that the second switching circuit 220 is not limited to the example shown in FIG. 11. For example, the second switching circuit 220 may include different arrangements of switches in other implementations.

FIG. 12 illustrates a method 1200 for operating a wireless device according to certain aspects. The wireless device includes a first antenna (e.g., first antenna 120) and a second antenna (e.g., second antenna 160).

At block 1210, in a first mode, a first radio frequency (RF) signal is received via the first antenna. For example, the first RF signal may be received by the receiver 115.

At block 1220, in the first mode, the first RF signal is filtered using a filter. For example, the first filter may correspond to the first filter 125. In certain aspects, the filter may include a bandpass filter having a passband spanning a first frequency band. In certain aspects, the first RF signal may be in the first frequency band.

At block 1230, in a second mode, a second RF signal is transmitted via the second antenna. For example, the second RF signal may be transmitted via the second antenna by the transmitter 118. In certain aspects, the second RF signal may be in a second frequency band, and the second frequency band is different from the first frequency band. In one example, the second frequency band may be outside the passband of the filter.

At block 1240, in the second mode, the second RF signal is received via the first antenna. For example, the second RF signal may be received by the receiver 115.

At block 1250, the second RF signal is routed through a bypass circuit that bypasses the filter. For example, the second RF signal may be routed by the first switching circuit 210.

At block 1260, in the second mode, a signal strength of the second RF signal is measured. For example, the signal strength may be measured by the processor 150 and/or the measurement circuit 280.

In certain aspects, the method 1200 may also include estimating an antenna coupling between the first antenna and the second antenna based on the measured signal strength. For example, the antenna coupling may be estimated by the processor 150.

Figure 13:
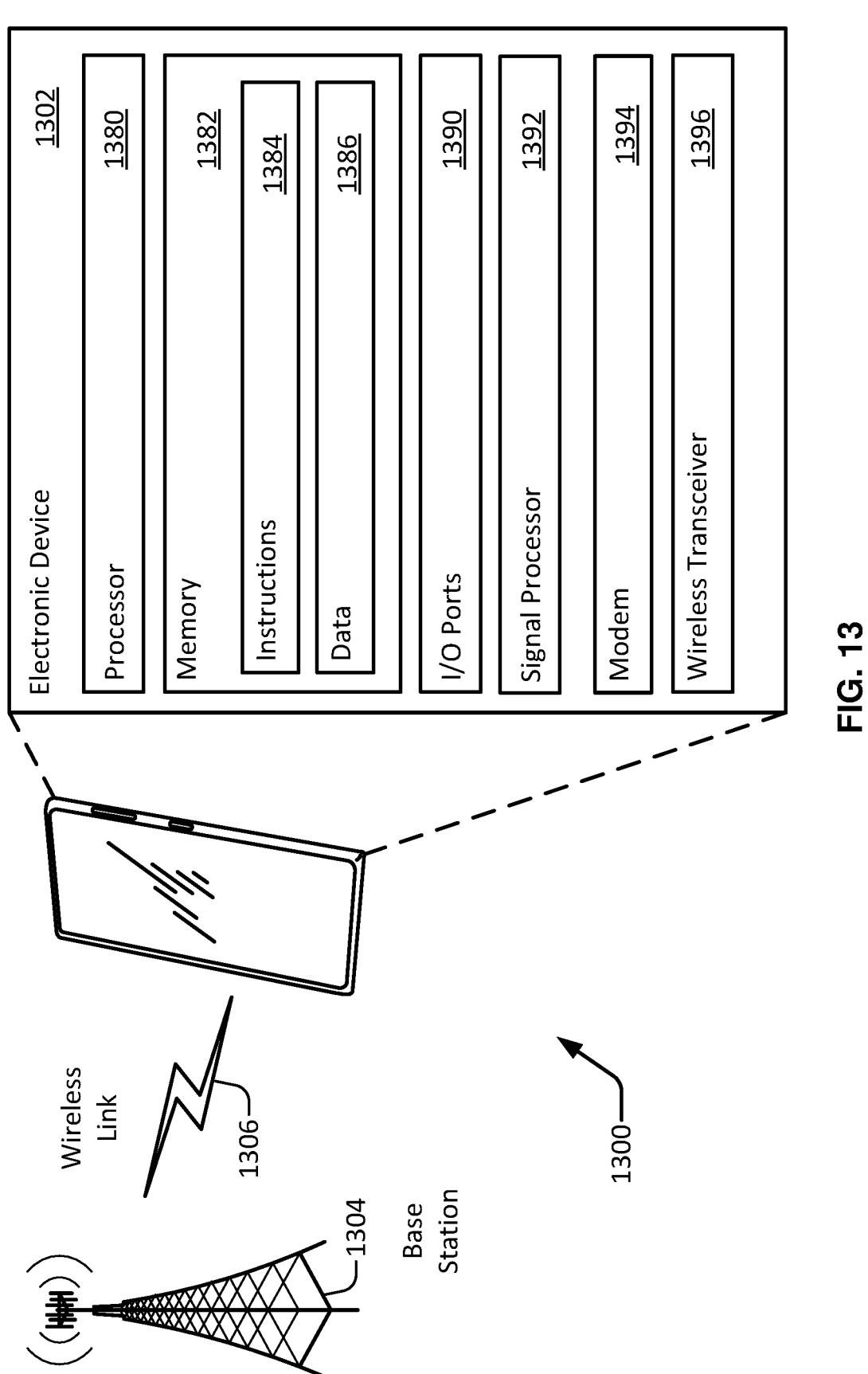
FIG. 13 is a diagram of an environment including an electronic device that includes a transceiver according to certain aspects of the present disclosure.

FIG. 13 is a diagram of an environment 1300 that includes an electronic device 1302 and a base station 1304. The electronic device 1302 may include the wireless device 110 including the antennas 120 and 160, the receiver 115, the transmitter 118, the mixer 140, the processor 150, and the control circuit 250.

In the environment 1300, the electronic device 1302 communicates with the base station 1304 via a wireless link 1306. As shown, the electronic device 1302 is depicted as a smart phone. However, the electronic device 1302 may be implemented as any suitable computing or other electronic device, such as a cellular base station, broadband router, access point, cellular or mobile phone, gaming device, navigation device, media device, laptop computer, desktop computer, tablet computer, server computer, network-attached storage (NAS) device, smart appliance, vehicle-based communication system, Internet of Things (IoT) device, sensor or security device, asset tracker, and so forth.

The base station 1304 communicates with the electronic device 1302 via the wireless link 1306, which may be implemented as any suitable type of wireless link. Although depicted as a base station tower of a cellular radio network, the base station 1304 may represent or be implemented as another device, such as a satellite, terrestrial broadcast tower, access point, peer to peer device, mesh network node, fiber optic line, another electronic device generally as described above, and so forth. Hence, the electronic device 1302 may communicate with the base station 1304 or another device via a wired connection, a wireless connection, or a combination thereof. The wireless link 1306 can include a downlink of data or control information communicated from the base station 1304 to the electronic device 1302 and an uplink of other data or control information communicated from the electronic device 1302 to the base station 1304. The wireless link 1306 may be implemented using any suitable communication protocol or standard, such as 3rd Generation Partnership Project Long-Term Evolution (3GPP LTE, 3GPP NR 5G), IEEE 1302.13, IEEE 1302.13, Bluetooth™, and so forth.

The electronic device 1302 includes a processor 1380 and a memory 1382. The processor 1380 may include the processor 150 and the memory 1382 may include the memory 290. The memory 1382 may be or form a portion of a computer readable storage medium. The processor 1380 may include any type of processor, such as an application processor or a multi-core processor, that is configured to execute processor-executable instructions (e.g., code) stored in the memory 1382. The memory 1382 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the memory 1382 is implemented to store instructions 1384, data 1386, and other information of the electronic device 1302.

The electronic device 1302 may also include input/output (I/O) ports 1390. The I/O ports 1390 enable data exchanges or interaction with other devices, networks, or users or between components of the device.

The electronic device 1302 may further include a signal processor (SP) 1392 (e.g., such as a digital signal processor (DSP)). The signal processor 1392 may function similar to the processor 1380 and may be capable of executing instructions and/or processing information in conjunction with the memory 1382.

For communication purposes, the electronic device 1302 also includes a modem 1394 (e.g., processor 150), a wireless transceiver 1396 (e.g., the receiver 115 and the transmitter 118), and one or more antennas (e.g., antennas 120 and 160). The wireless transceiver 1396 provides connectivity to respective networks and other electronic devices connected therewith using RF wireless signals. The wireless transceiver 1396 may facilitate communication over any suitable type of wireless network, such as a wireless local area network (LAN) (WLAN), a peer to peer (P2P) network, a mesh network, a cellular network, a wireless wide area network (WWAN), a navigational network (e.g., the Global Positioning System (GPS) of North America or another Global Navigation Satellite System (GNSS)), and/or a wireless personal area network (WPAN).

As used herein, a "passband" of a filter may be a frequency range within which the filter passes a signal with an attenuation of less than 3 dB (e.g., the gain of the filter within the frequency range is above −3 dB). In certain aspect, the second frequency band discussed above may be outside the passband of the first filter 125 (e.g., the first filter 125 attenuates a signal in the second frequency band by more than 3 dB). However, it is to be appreciated that the present disclosure is not limited to this example. In certain aspects, the first filter 125 may attenuate a signal in the second frequency band by more than 20 dB, more than 30 dB, or more than 40 dB (e.g., the gain of the filter 125 in the second frequency band is less than −20 dB, less than −30 dB, or less than −40 dB).

Implementation examples are described in the following numbered clauses:

1. A system for wireless communications, comprising:
   a first radio frequency front-end (RFFE) circuit coupled to a first antenna and comprising:
   a first filter having a first passband spanning a first frequency band;
   a first low-noise amplifier (LNA) coupled to the first filter;
   a bypass circuit configured to bypass the first filter, the bypass circuit including an attenuator; and
   a first switching circuit configured to couple the first antenna to the first filter or the bypass circuit; and
   a second RFFE circuit coupled to a second antenna and comprising:
   a power amplifier; and
   a second filter coupled between the power amplifier and the second antenna, the second filter having a second passband spanning a second frequency band different than the first frequency band.

2. The system of clause 1, further comprising a controller configured to cause the first switching circuit to couple the first antenna to the bypass circuit during a time period when the system is configured to transmit a signal in the second frequency band via the second RFFE circuit and the second antenna.

3. The system of clause 2, further comprising a processor configured to measure a signal level of the signal based on an output of the bypass circuit.

4. The system of clause 2 or 3, wherein the controller is configured to cause the first switching circuit to couple the first antenna to the first filter during a time period when the first antenna receives a signal in the first frequency band.

5. The system of any one of clauses 1 to 4, further comprising:
   a mixer; and
   a second switching circuit configured to couple the mixer to an output of the first LNA or an output of the bypass circuit.

6. The system of clause 5, further comprising a controller configured to:
   in a first mode, cause the first switching circuit to couple the first antenna to the first filter, and cause the second switching circuit to couple the mixer to the output of the first LNA; and
   in a second mode, cause the first switching circuit to couple the first antenna to the bypass circuit, and cause the second switching circuit to couple the mixer to the output of the bypass circuit.

7. The system of clause 6, further comprising a frequency synthesizer coupled to the mixer, wherein the frequency synthesizer is configured to output an oscillator signal to the mixer.

8. The system of clause 7, wherein the controller is configured to:

in the first mode, cause the frequency synthesizer to set a frequency of the oscillator signal to a first frequency in the first frequency band; and in the second mode, cause the frequency synthesizer to set the frequency of the oscillator signal to a second frequency in the second frequency band.

9. The system of any one of clauses 1 to 8, further comprising a processor configured to measure a signal level of a signal in the second frequency band received via the bypass circuit and the first antenna, the signal being transmitted via the second antenna and the second RFFE circuit.

10. The system of clause 9, wherein the processor is configured to determine a level of antenna coupling between the first antenna and the second antenna based on the measured signal level of the signal.

11. The system of any one of clauses 1 to 10, wherein the first RFFE circuit is included in a first RFFE module and the second RFFE circuit is included in a second RFFE module different from the first RFFE module, and the first RFFE module and the second RFFE module are coupled to a transceiver integrated circuit.

12. The system of any one of clauses 1 to 11, wherein the bypass circuit further comprises:

a second LNA having an input and an output; and a switch, wherein the attenuator and the switch are coupled in series between the input of the second LNA and the output of the second LNA.

13. The system of clause 12, wherein the second LNA is tuned to a frequency of a coexisting signal received via the first antenna.

14. The system of clause 13, wherein the frequency of the coexisting signal is in a frequency range of 4.2 GHz to 4.4. GHz.

15. The system of clause 13 or 14, further comprising a controller configured to turn on the switch and cause the first switching circuit to couple the first antenna to the bypass circuit during a time period when the first antenna receives the coexisting signal.

16. The system of clause 15, wherein the controller is configured to turn off the switch and cause the first switching circuit to couple the first antenna to the bypass circuit during a time period when the system is configured to transmit a signal in the second frequency band via the second RFFE circuit and the second antenna.

17. A method for operating a wireless device, the wireless device including a first antenna and a second antenna, the method comprising:

in a first mode, receiving a first radio frequency (RF) signal via the first antenna; and filtering the first RF signal using a filter;

in a second mode, transmitting a second RF signal via the second antenna;

receiving the second RF signal via the first antenna;

routing the second RF signal through a bypass circuit that bypasses the filter; and measuring a signal strength of the second RF signal.

18. The method of clause 17, wherein the filter comprises a bandpass filter having a passband spanning a first frequency band.

19. The method of clause 18, wherein the second RF signal is in a second frequency band, and the second frequency band is different than the first frequency band.

20. The method of any one of clauses 17 to 19, further comprising attenuating the second RF signal using an attenuator in the bypass circuit.

21. The method of any one of clauses 17 to 20, further comprising, in the second mode, estimating an antenna coupling between the first antenna and the second antenna based on the measured signal strength.

22. The method of any one of clauses 17 to 21, wherein the first RF signal is transmitted from a base station.

23. The method of any one of clauses 17 to 22, further comprising:

measuring a signal strength of the first RF signal after filtering by the filter; and characterizing a filter rejection of the filter based on a difference between the measured signal strength of the first RF signal and the measured signal strength of the second RF signal.

24. The method of any one of clauses 17 to 23, further comprising:

in the second mode, receiving a coexisting signal via the first antenna;

routing the coexisting signal through the bypass circuit;

amplifying the coexisting signal using a low-noise amplifier in the bypass circuit;

measuring a signal strength of the coexisting signal; and detecting the coexisting signal based on the measured signal strength of the coexisting signal.

25. The method of clause 24, wherein the coexisting signal comprises a radio altimeter signal.

26. The method of clause 24 or 25, further comprising receiving a third RF signal via the first antenna concurrently with the coexisting signal; and recovering data from the third RF signal.

27. The method of any one of clauses 24 to 26, further comprising, in response to detecting the coexisting signal, causing a transmitter on the wireless device to cease transmission in a frequency band of the coexisting signal or reduce transmission power in the frequency band of the coexisting signal.

28. The method of any one of clauses 24 to 27, wherein the coexisting signal has a frequency in a frequency range of 4.2 GHz to 4.4. GHz.

29. The method of any one of clauses 24 to 27, wherein the coexisting signal comprises an ultra wide band (UWB) signal.

30. The method of any one of clauses 17 to 29, further comprising, in the first mode, recovering data from the first RF signal after filtering using the filter.

31. A system including a first antenna and a second antenna, the system comprising:

means for receiving a first radio frequency (RF) signal via the first antenna;

means for filtering the first RF signal;

means for transmitting a second RF signal via the second antenna, the means for receiving the first RF signal via the first antenna further comprising means for receiving the second RF signal via the first antenna;

means for routing the second RF signal through a bypass circuit that bypasses the means for filtering; and means for measuring a signal strength of the second RF signal.

32. A system for wireless communications, comprising:

a first radio frequency front-end (RFFE) circuit coupled to a first antenna, the first RFFE circuit designed to condition signals for transmission and/or reception in a first frequency range, the first RFFE circuit comprising one or more circuits configured to provide a broadband bypass mode for a receive signal in a second frequency range different from the first frequency range; and a second RFFE circuit coupled to a second antenna, the second RFFE circuit designed to condition signals for transmission and/or reception in the second frequency range.

33. The system of clause 32, further comprising a processor configured to measure a level of antenna coupling between the first antenna and the second antenna based on an output of the first RFFE circuit in response to a transmit signal transmitted via the second antenna via the second RFFE circuit.

34. A system for wireless communications, comprising:

a modem integrated circuit;

a transceiver integrated circuit coupled to the modem integrated circuit;

a first radio frequency front-end (RFFE) circuit coupled between the transceiver integrated circuit and a first antenna, the first RFFE circuit comprising:

a first low-noise amplifier (LNA) configured to amplify a first signal in a first frequency band;

a first filter coupled to the first LNA, the first filter having a first passband spanning the first frequency band;

a bypass circuit configured to bypass the first filter, the bypass circuit configured to pass a second signal in a second frequency band different than the first frequency band to the transceiver circuit; and a first switching circuit configured to couple the first antenna to the first filter or the bypass circuit; and a second RFFE circuit coupled between the transceiver integrated circuit and a second antenna and comprising:

a first power amplifier; and a second filter coupled between the first power amplifier and the second antenna, the second filter having a second passband spanning the second frequency band.

35. The system of clause 34, wherein the bypass circuit comprises an attenuator configured to attenuate the second signal in the second frequency band.

36. The system of clause 34 or 35, further comprising a controller configured to cause the first switching circuit to couple the first antenna to the bypass circuit during a time period when the system is configured to transmit the second signal in the second frequency band via the second RFFE circuit and the second antenna.

37. The system of clause 36, wherein the transceiver integrated circuit is configured to measure a signal level of the second signal based on an output of the bypass circuit.

38. The system of clause 36 or 37, wherein the transceiver integrated circuit comprises a mixer configured to receive a local oscillator signal having a frequency in the second frequency band.

39. The system of any one of clauses 34 to 38, wherein the transceiver integrated circuit and/or the modem integrated circuit or some combination thereof is/are configured to measure a signal level of the second signal in the second frequency band received via the bypass circuit based on a transmit signal transmitted via the second antenna and the second RFFE circuit.

40. The system of any one of clauses 34 to 39, wherein the transceiver integrated circuit and/or the modem integrated circuit or some combination thereof is/are configured to determine a level of antenna coupling between the first antenna and the second antenna based on an output of the bypass circuit.

41. The system of any one of clauses 34 to 40, wherein the first RFFE circuit is a low-band (LB) RFFE module and the second RFFE circuit is a mid-high-band (MHB) RFFE module.

42. The system of any one of clauses 34 to 40, wherein the first RFFE circuit is a mid-high-band (MHB) RFFE module and the second RFFE circuit is a low-band (LB) RFFE module.

43. A system for wireless communications, comprising:

a filter having a passband spanning a first frequency band;

a first low-noise amplifier (LNA) coupled to the filter, the first LNA tuned to amplify a first signal in the first frequency band;

a bypass circuit configured to bypass the filter, the bypass circuit including a second LNA tuned to amplify a second signal in a second frequency band different than the first frequency band; and a first switching circuit configured to couple a first antenna to the filter or the bypass circuit.

44. The system of clause 43, wherein the second signal comprises a radio altimeter signal.

45. The system of clause 43 or 44, wherein the second signal has a frequency in a frequency range of 4.2 GHz to 4.4. GHz.

46. The system of clause 43, wherein the second signal comprises an ultra wide band (UWB) signal.

47. The system of clause 43, wherein the first frequency band is in a low band (LB) and the second frequency band is in a mid-high band (MHB).

48. The system of clause 43, wherein the second frequency band is in a low band (LB) and the first frequency band is in a mid-high band (MHB).

49. The system of clause 43, wherein the first frequency band is in a frequency range of 0.6 to 1 GHz and the second frequency band is in a frequency range of 1.8 to 2.7 GHz.

50. The system of clause 43, wherein the second frequency band is in a frequency range of 0.6 to 1 GHz and the first frequency band is in a frequency range of 1.8 to 2.7 GHz.

51. The system of any one of clauses 43 to 50, further comprising a controller configured to:

in a first mode, cause the first switching circuit to couple the first antenna to the filter; and in a second mode, cause the first switching circuit to couple the first antenna to the second LNA.

52. The system of clause 51, further comprising a processor configured to:

in the first mode, recover data in the first signal after the first signal is amplified by the first LNA; and in the second mode, measure a signal strength of the second signal after the second signal is amplified by the second LNA.

53. The system of clause 52, further comprising a transmitter coupled to a second antenna, wherein the processor is configured to detect the second signal based on the measured signal strength, and, in response to detecting the second signal, cause the transmitter to cease transmission in the second frequency band or reduce transmission power in the second frequency band.

54. The system of clause 52 or 53, wherein the first signal is transmitted from a base station.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. It is also to be appreciated that the term "ground" may refer to a DC ground or an AC ground, and thus the term "ground" covers both possibilities.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system for wireless communications, comprising:
a first radio frequency front-end (RFFE) circuit coupled to a first antenna and comprising:
a first filter having a first passband spanning a first frequency band;
a first low-noise amplifier (LNA) coupled to the first filter;
a bypass circuit configured to bypass the first filter and the first LNA, the bypass circuit including an attenuator; and
a first switching circuit configured to couple the first antenna to the first filter or the bypass circuit; and
a second RFFE circuit coupled to a second antenna and comprising:
a power amplifier; and
a second filter coupled between the power amplifier and the second antenna, the second filter having a second passband spanning a second frequency band different than the first frequency band.

2. The system of claim 1, further comprising a controller configured to cause the first switching circuit to couple the first antenna to the bypass circuit during a time period when the system is configured to transmit a signal in the second frequency band via the second RFFE circuit and the second antenna.

3. The system of claim 2, further comprising a processor configured to measure a signal level of the signal based on an output of the bypass circuit.

4. The system of claim 2, wherein the controller is configured to cause the first switching circuit to couple the first antenna to the first filter during a time period when the first antenna receives a signal in the first frequency band.

5. The system of claim 1, further comprising:
a mixer; and
a second switching circuit configured to couple the mixer to an output of the first LNA or an output of the bypass circuit.

6. The system of claim 5, further comprising a controller configured to:

in a first mode, cause the first switching circuit to couple the first antenna to the first filter, and cause the second switching circuit to couple the mixer to the output of the first LNA; and in a second mode, cause the first switching circuit to couple the first antenna to the bypass circuit, and cause the second switching circuit to couple the mixer to the output of the bypass circuit.

7. The system of claim 6, further comprising a frequency synthesizer coupled to the mixer, wherein the frequency synthesizer is configured to output an oscillator signal to the mixer.

8. The system of claim 7, wherein the controller is configured to:
in the first mode, cause the frequency synthesizer to set a frequency of the oscillator signal to a first frequency in the first frequency band; and
in the second mode, cause the frequency synthesizer to set the frequency of the oscillator signal to a second frequency in the second frequency band.

9. The system of claim 1, further comprising a processor configured to measure a signal level of a signal in the second frequency band received via the bypass circuit and the first antenna, the signal being transmitted via the second antenna and the second RFFE circuit.

10. The system of claim 9, wherein the processor is configured to determine a level of antenna coupling between the first antenna and the second antenna based on the measured signal level of the signal.

11. The system of claim 1, wherein the first RFFE circuit is included in a first RFFE module and the second RFFE circuit is included in a second RFFE module different from the first RFFE module, and the first RFFE module and the second RFFE module are coupled to a transceiver integrated circuit.

12. The system of claim 1, wherein the bypass circuit further comprises:
a second LNA having an input and an output; and
a switch, wherein the attenuator and the switch are coupled in series between the input of the second LNA and the output of the second LNA.

13. The system of claim 12, wherein the second LNA is tuned to a frequency of a coexisting signal received via the first antenna.

14. The system of claim 13, wherein the frequency of the coexisting signal is in a frequency range of 4.2 GHz to 4.4 GHz.

15. The system of claim 13, further comprising a controller configured to turn on the switch and cause the first switching circuit to couple the first antenna to the bypass circuit during a time period when the first antenna receives the coexisting signal.

16. The system of claim 15, wherein the controller is configured to turn off the switch and cause the first switching circuit to couple the first antenna to the bypass circuit during a time period when the system is configured to transmit a signal in the second frequency band via the second RFFE circuit and the second antenna.

17. A method for operating a wireless device, the wireless device including a first antenna and a second antenna, the method comprising:
in a first mode,
receiving a first radio frequency (RF) signal via the first antenna; and
filtering the first RF signal using a filter;
in a second mode,
transmitting a second RF signal via the second antenna;

receiving the second RF signal via the first antenna;

routing the second RF signal through a bypass circuit that bypasses the filter; and measuring a signal strength of the second RF signal.

18. The method of claim 17, wherein the filter comprises a bandpass filter having a passband spanning a first frequency band.

19. The method of claim 18, wherein the second RF signal is in a second frequency band, and the second frequency band is different than the first frequency band.

20. The method of claim 17, further comprising attenuating the second RF signal using an attenuator in the bypass circuit.

21. The method of claim 17, further comprising, in the second mode, estimating an antenna coupling between the first antenna and the second antenna based on the measured signal strength.

22. The method of claim 17, wherein the first RF signal is transmitted from a base station.

23. The method of claim 17, further comprising:

measuring a signal strength of the first RF signal after filtering by the filter; and characterizing a filter rejection of the filter based on a difference between the measured signal strength of the first RF signal and the measured signal strength of the second RF signal.

24. The method of claim 17, further comprising:

in the second mode, receiving a coexisting signal via the first antenna;

routing the coexisting signal through the bypass circuit;

amplifying the coexisting signal using a low-noise amplifier in the bypass circuit;

measuring a signal strength of the coexisting signal; and detecting the coexisting signal based on the measured signal strength of the coexisting signal.

25. The method of claim 24, wherein the coexisting signal comprises a radio altimeter signal.

26. The method of claim 24, further comprising receiving a third RF signal via the first antenna concurrently with the coexisting signal; and recovering data from the third RF signal.

27. The method of claim 24, further comprising, in response to detecting the coexisting signal, causing a transmitter on the wireless device to cease transmission in a frequency band of the coexisting signal or reduce transmission power in the frequency band of the coexisting signal.

28. A system including a first antenna and a second antenna, the system comprising:

means for receiving a first radio frequency (RF) signal via the first antenna;

means for filtering the first RF signal;

means for transmitting a second RF signal via the second antenna, the means for receiving the first RF signal via the first antenna further comprising means for receiving the second RF signal via the first antenna;

means for routing the second RF signal through a bypass circuit that bypasses the means for filtering; and means for measuring a signal strength of the second RF signal.

29. A system for wireless communications, comprising:

a first radio frequency front-end (RFFE) circuit coupled to a first antenna, the first RFFE circuit designed to condition signals for transmission and/or reception in a first frequency range, the first RFFE circuit comprising one or more circuits configured to provide a broadband bypass mode for a receive signal in a second frequency range different from the first frequency range;

a second RFFE circuit coupled to a second antenna, the second RFFE circuit designed to condition signals for transmission and/or reception in the second frequency range; and a processor configured to:

cause the second RFFE circuit to transmit a transmit signal in the second frequency range via the second antenna; and cause the first RFFE circuit to operate in the broadband bypass mode to receive the transmit signal transmitted via the second antenna and received via the first antenna.

30. The system of claim 29, wherein the processor is configured to measure a level of antenna coupling between the first antenna and the second antenna based on an output of the first RFFE circuit in response to the transmit signal transmitted via the second antenna via the second RFFE circuit.

* * * * *